(12) United States Patent
Robinson et al.

(10) Patent No.: US 8,268,899 B2
(45) Date of Patent: Sep. 18, 2012

(54) PROCESSES FOR HYDROMETHANATION OF A CARBONACEOUS FEEDSTOCK

(75) Inventors: Earl T. Robinson, Lakeland, FL (US); Pattabhi K. Raman, Kildeer, IL (US); Vincent G. Reiling, Wheaton, IL (US)

(73) Assignee: Greatpoint Energy, Inc., Cambridge, MA (US)

( * ) Notice: Subject to any disclaimer, the term of this patent is extended or adjusted under 35 U.S.C. 154(b) by 244 days.

(21) Appl. No.: 12/778,538

(22) Filed: May 12, 2010

(65) Prior Publication Data
US 2010/0292350 A1 Nov. 18, 2010

Related U.S. Application Data

(60) Provisional application No. 61/177,848, filed on May 13, 2009.

(51) Int. Cl.
*C07C 27/00* (2006.01)
(52) U.S. Cl. ......... 518/703; 518/700; 518/702; 518/704
(58) Field of Classification Search ........... 518/700–704
See application file for complete search history.

(56) References Cited

U.S. PATENT DOCUMENTS

| | | | |
|---|---|---|---|
| 2,813,126 A | 11/1957 | Tierney |
| 2,886,405 A | 5/1959 | Benson et al. |
| 3,034,848 A | 5/1962 | King |
| 3,114,930 A | 12/1963 | Oldham et al. |
| 3,164,330 A | 1/1965 | Neidl |
| 3,435,590 A | 4/1969 | Smith |
| 3,531,917 A | 10/1970 | Grunewald et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A | 9/1975 | Graboski et al. |
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,966,875 A | 6/1976 | Bratzler et al. |
| 3,969,089 A | 7/1976 | Moss et al. |
| 3,972,693 A | 8/1976 | Wiesner et al. |
| 3,975,168 A | 8/1976 | Gorbaty |
| 3,985,519 A | 10/1976 | Kalina et al. |
| 3,989,811 A | 11/1976 | Hill |
| 3,996,014 A | 12/1976 | Muller et al. |
| 3,998,607 A | 12/1976 | Wesswlhoft et al. |
| 3,999,607 A | 12/1976 | Pennington et al. |
| 4,005,996 A | 2/1977 | Hausberger et al. |
| 4,011,066 A | 3/1977 | Bratzler et al. |
| 4,021,370 A | 5/1977 | Harris et al. |
| 4,025,423 A | 5/1977 | Stonner et al. |
| 4,044,098 A | 8/1977 | Miller et al. |
| 4,046,523 A | 9/1977 | Kalina et al. |
| 4,052,176 A | 10/1977 | Child et al. |
| 4,053,554 A | 10/1977 | Reed et al. |
| 4,057,512 A | 11/1977 | Vadovic et al. |
| 4,069,304 A | 1/1978 | Starkovich et al. |
| 4,077,778 A | 3/1978 | Nahas et al. |
| 4,091,073 A | 5/1978 | Winkler |
| 4,092,125 A | 5/1978 | Stambaugh et al. |
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,113,615 A | 9/1978 | Gorbaty |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,162,902 A | 7/1979 | Wiesner et al. |
| 4,189,307 A | 2/1980 | Marion |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,225,457 A | 9/1980 | Schulz |

(Continued)

FOREIGN PATENT DOCUMENTS

CA 966660 4/1975

(Continued)

OTHER PUBLICATIONS

U.S. Appl. No. 12/778,538, filed May 12, 2010, Robinson, et al.

(Continued)

*Primary Examiner* — Jafar Parsa
(74) *Attorney, Agent, or Firm* — McDonnell Boehnen Hulbert & Berghoff LLP

(57) ABSTRACT

The present invention relates to processes for preparing gaseous products, and in particular methane, via the catalytic hydromethanation of a carbonaceous feedstock in the presence of steam, syngas and an oxygen-rich gas stream.

21 Claims, 2 Drawing Sheets

U.S. PATENT DOCUMENTS

| | | |
|---|---|---|
| 4,235,044 A | 11/1980 | Cheung |
| 4,243,639 A | 1/1981 | Haas et al. |
| 4,249,471 A | 2/1981 | Gunnerman |
| 4,252,771 A | 2/1981 | Lagana et al. |
| 4,260,421 A | 4/1981 | Brown et al. |
| 4,265,868 A | 5/1981 | Kamody |
| 4,270,937 A | 6/1981 | Adler et al. |
| 4,284,416 A | 8/1981 | Nahas |
| 4,292,048 A | 9/1981 | Wesselhoft et al. |
| 4,298,584 A | 11/1981 | Makrides |
| 4,315,758 A | 2/1982 | Patel et al. |
| 4,318,712 A | 3/1982 | Lang et al. |
| 4,322,222 A | 3/1982 | Sass |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,344,486 A | 8/1982 | Parrish |
| 4,347,063 A | 8/1982 | Sherwood et al. |
| 4,348,486 A | 9/1982 | Calvin et al. |
| 4,348,487 A | 9/1982 | Goldstein et al. |
| 4,353,713 A | 10/1982 | Cheng |
| 4,365,975 A | 12/1982 | Williams et al. |
| 4,372,755 A | 2/1983 | Tolman et al. |
| 4,375,362 A | 3/1983 | Moss |
| 4,397,656 A | 8/1983 | Ketkar |
| 4,400,182 A | 8/1983 | Davies et al. |
| 4,407,206 A | 10/1983 | Bartok et al. |
| 4,428,535 A | 1/1984 | Venetucci |
| 4,432,773 A | 2/1984 | Euker, Jr. et al. |
| 4,433,065 A | 2/1984 | Van der Burgt et al. |
| 4,436,028 A | 3/1984 | Wilder |
| 4,436,531 A | 3/1984 | Estabrook et al. |
| 4,439,210 A | 3/1984 | Lancet |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,478,725 A | 10/1984 | Velling et al. |
| 4,482,529 A | 11/1984 | Chen et al. |
| 4,491,609 A | 1/1985 | Degel et al. |
| 4,497,784 A | 2/1985 | Diaz |
| 4,500,323 A | 2/1985 | Siegfried et al. |
| 4,505,881 A | 3/1985 | Diaz |
| 4,508,544 A | 4/1985 | Moss |
| 4,508,693 A | 4/1985 | Diaz |
| 4,515,604 A | 5/1985 | Eisenlohr et al. |
| 4,515,764 A | 5/1985 | Diaz |
| 4,524,050 A | 6/1985 | Chen et al. |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,572,826 A | 2/1986 | Moore |
| 4,594,140 A | 6/1986 | Cheng |
| 4,597,775 A | 7/1986 | Billimoria et al. |
| 4,597,776 A | 7/1986 | Ullman et al. |
| 4,604,105 A | 8/1986 | Aquino et al. |
| 4,609,388 A | 9/1986 | Adler et al. |
| 4,609,456 A | 9/1986 | Deschamps et al. |
| 4,617,027 A | 10/1986 | Lang |
| 4,619,864 A | 10/1986 | Hendrix et al. |
| 4,620,421 A | 11/1986 | Brown et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,808,194 A | 2/1989 | Najjar et al. |
| 4,810,475 A | 3/1989 | Chu et al. |
| 4,822,935 A | 4/1989 | Scott |
| 4,848,983 A | 7/1989 | Tomita et al. |
| 4,854,944 A | 8/1989 | Strong |
| 4,861,346 A | 8/1989 | Najjar et al. |
| 4,861,360 A | 8/1989 | Apffel |
| 4,872,886 A | 10/1989 | Henley et al. |
| 4,876,080 A | 10/1989 | Paulson |
| 4,892,567 A | 1/1990 | Yan |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,236,557 A | 8/1993 | Muller et al. |
| 5,250,083 A | 10/1993 | Wolfenbarger et al. |
| 5,277,884 A | 1/1994 | Shinnar et al. |
| 5,435,940 A | 7/1995 | Doering et al. |
| 5,536,893 A | 7/1996 | Gudmundsson |
| 5,616,154 A | 4/1997 | Elliott et al. |
| 5,630,854 A | 5/1997 | Sealock, Jr. et al. |
| 5,641,327 A | 6/1997 | Leas |
| 5,660,807 A | 8/1997 | Forg et al. |
| 5,670,122 A | 9/1997 | Zamansky et al. |
| 5,720,785 A | 2/1998 | Baker |
| 5,733,515 A | 3/1998 | Doughty et al. |
| 5,776,212 A | 7/1998 | Leas |
| 5,788,724 A | 8/1998 | Carugati et al. |
| 5,855,631 A | 1/1999 | Leas |
| 5,865,898 A | 2/1999 | Holtzapple et al. |
| 5,968,465 A | 10/1999 | Koveal et al. |
| 6,013,158 A | 1/2000 | Wootten |
| 6,015,104 A | 1/2000 | Rich, Jr. |
| 6,028,234 A | 2/2000 | Heinemann et al. |
| 6,090,356 A | 7/2000 | Jahnke et al. |
| 6,132,478 A | 10/2000 | Tsurui et al. |
| 6,180,843 B1 | 1/2001 | Heinemann et al. |
| 6,187,465 B1 | 2/2001 | Galloway |
| 6,379,645 B1 | 4/2002 | Bucci et al. |
| 6,389,820 B1 | 5/2002 | Rogers et al. |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,855,852 B1 | 2/2005 | Jackson et al. |
| 6,878,358 B2 | 4/2005 | Vosteen et al. |
| 6,894,183 B2 | 5/2005 | Choudhary et al. |
| 6,955,695 B2 | 10/2005 | Nahas |
| 6,969,494 B2 | 11/2005 | Herbst |
| 7,074,373 B1 | 7/2006 | Warren et al. |
| 7,132,183 B2 | 11/2006 | Galloway |
| 7,205,448 B2 | 4/2007 | Gajda et al. |
| 7,220,502 B2 | 5/2007 | Galloway |
| 7,309,383 B2 | 12/2007 | Beech, Jr. et al. |
| 7,897,126 B2 | 3/2011 | Rappas et al. |
| 7,901,644 B2 | 3/2011 | Rappas et al. |
| 7,922,782 B2 | 4/2011 | Sheth |
| 7,926,750 B2 | 4/2011 | Hauserman |
| 7,976,593 B2 | 7/2011 | Graham |
| 2002/0036086 A1 | 3/2002 | Minkkinen et al. |
| 2003/0131582 A1 | 7/2003 | Anderson et al. |
| 2003/0167691 A1 | 9/2003 | Nahas |
| 2004/0020123 A1 | 2/2004 | Kimura et al. |
| 2004/0180971 A1 | 9/2004 | Inoue et al. |
| 2005/0107648 A1 | 5/2005 | Kimura et al. |
| 2005/0137442 A1 | 6/2005 | Gajda et al. |
| 2005/0287056 A1 | 12/2005 | Baker et al. |
| 2006/0265953 A1 | 11/2006 | Hobbs |
| 2007/0000177 A1 | 1/2007 | Hippo et al. |

| Publication No. | Date | Inventor | Country | Number | Date |
|---|---|---|---|---|---|
| 2007/0051043 A1 | 3/2007 | Schingnitz | EP | 0 225 146 | 6/1987 |
| 2007/0083072 A1 | 4/2007 | Nahas | EP | 0 259 927 | 3/1988 |
| 2007/0180990 A1 | 8/2007 | Downs et al. | EP | 0 723 930 | 7/1996 |
| 2007/0186472 A1 | 8/2007 | Rabovitser et al. | EP | 1 001 002 | 5/2000 |
| 2007/0237696 A1 | 10/2007 | Payton | EP | 1 207 132 | 5/2002 |
| 2007/0277437 A1 | 12/2007 | Sheth | EP | 1 741 673 | 6/2006 |
| 2007/0282018 A1 | 12/2007 | Jenkins | EP | 2058471 | 5/2009 |
| 2009/0048476 A1 | 2/2009 | Rappas et al. | FI | 819 | 4/2000 |
| 2009/0090055 A1 | 4/2009 | Ohtsuka | FR | 797 089 | 4/1936 |
| 2009/0090056 A1 | 4/2009 | Ohtsuka | FR | 2 478 615 | 9/1981 |
| 2009/0165361 A1 | 7/2009 | Rappas et al. | FR | 2906879 | 4/2008 |
| 2009/0165376 A1 | 7/2009 | Lau et al. | GB | 593910 | 10/1947 |
| 2009/0165379 A1 | 7/2009 | Rappas | GB | 640907 | 8/1950 |
| 2009/0165380 A1 | 7/2009 | Lau et al. | GB | 676615 | 7/1952 |
| 2009/0165381 A1 | 7/2009 | Robinson | GB | 701 131 | 12/1953 |
| 2009/0165382 A1 | 7/2009 | Rappas et al. | GB | 760627 | 11/1956 |
| 2009/0165383 A1 | 7/2009 | Rappas et al. | GB | 798741 | 7/1958 |
| 2009/0165384 A1 | 7/2009 | Lau et al. | GB | 820 257 | 9/1959 |
| 2009/0166588 A1 | 7/2009 | Spitz et al. | GB | 996327 | 6/1965 |
| 2009/0169448 A1 | 7/2009 | Rappas et al. | GB | 1033764 | 6/1966 |
| 2009/0169449 A1 | 7/2009 | Rappas et al. | GB | 1448562 | 9/1976 |
| 2009/0170968 A1 | 7/2009 | Nahas et al. | GB | 1453081 | 10/1976 |
| 2009/0173079 A1 | 7/2009 | Wallace et al. | GB | 1467219 | 3/1977 |
| 2009/0217575 A1 | 9/2009 | Raman et al. | GB | 1467995 | 3/1977 |
| 2009/0217582 A1 | 9/2009 | May et al. | GB | 1 599 932 | 7/1977 |
| 2009/0217584 A1 | 9/2009 | Raman et al. | GB | 2078251 | 1/1982 |
| 2009/0217585 A1 | 9/2009 | Raman et al. | GB | 2154600 | 9/1985 |
| 2009/0217586 A1 | 9/2009 | Rappas et al. | GB | 2455864 | 6/2009 |
| 2009/0217587 A1 | 9/2009 | Raman et al. | JP | 54020003 | 2/1979 |
| 2009/0217588 A1 | 9/2009 | Hippo et al. | JP | 56157493 | 12/1981 |
| 2009/0217589 A1 | 9/2009 | Robinson | JP | 62241991 | 10/1987 |
| 2009/0217590 A1 | 9/2009 | Rappas et al. | JP | 62 257985 | 11/1987 |
| 2009/0218424 A1 | 9/2009 | Hauserman | JP | 2000290659 | 10/2000 |
| 2009/0220406 A1 | 9/2009 | Rahman | JP | 2000290670 | 10/2000 |
| 2009/0229182 A1 | 9/2009 | Raman et al. | JP | 2002105467 | 4/2002 |
| 2009/0246120 A1 | 10/2009 | Raman et al. | JP | 2004292200 | 10/2004 |
| 2009/0259080 A1 | 10/2009 | Raman et al. | JP | 2004298818 | 10/2004 |
| 2009/0260287 A1 | 10/2009 | Lau | JP | 2006 169476 A | 6/2006 |
| 2009/0324458 A1 | 12/2009 | Robinson et al. | WO | 00/18681 | 4/2000 |
| 2009/0324459 A1 | 12/2009 | Robinson et al. | WO | WO 00/43468 | 7/2000 |
| 2009/0324460 A1 | 12/2009 | Robinson et al. | WO | WO 02/40768 | 5/2002 |
| 2009/0324461 A1 | 12/2009 | Robinson et al. | WO | WO 02/079355 | 10/2002 |
| 2009/0324462 A1 | 12/2009 | Robinson et al. | WO | 02/103157 | 12/2002 |
| 2010/0071235 A1 | 3/2010 | Pan et al. | WO | 03/018958 | 3/2003 |
| 2010/0071262 A1 | 3/2010 | Robinson et al. | WO | WO 03/033624 | 4/2003 |
| 2010/0076235 A1 | 3/2010 | Reiling et al. | WO | 2004/055323 | 7/2004 |
| 2010/0120926 A1 | 5/2010 | Robinson et al. | WO | WO 2004/072210 | 8/2004 |
| 2010/0121125 A1 | 5/2010 | Hippo et al. | WO | WO 2006/031011 | 3/2006 |
| 2010/0168494 A1 | 7/2010 | Rappas et al. | WO | WO 2007/005284 | 1/2007 |
| 2010/0168495 A1 | 7/2010 | Rappas et al. | WO | WO 2007/047210 | 4/2007 |
| 2010/0179232 A1 | 7/2010 | Robinson et al. | WO | 2007/068682 | 6/2007 |
| 2010/0287835 A1 | 11/2010 | Reiling et al. | WO | 2007/077137 | 7/2007 |
| 2010/0287836 A1 | 11/2010 | Robinson et al. | WO | 2007/077138 | 7/2007 |
| 2010/0292350 A1 | 11/2010 | Robinson et al. | WO | 2007/083072 | 7/2007 |
| 2011/0031439 A1 | 2/2011 | Sirdeshpande et al. | WO | WO 2007/076363 | 7/2007 |
| 2011/0062012 A1 | 3/2011 | Robinson | WO | WO 2007/128370 | 11/2007 |
| 2011/0062721 A1 | 3/2011 | Sirdeshpande et al. | WO | 2007/143376 | 12/2007 |
| 2011/0062722 A1 | 3/2011 | Sirdeshpande et al. | WO | WO 2007/143376 | 12/2007 |
| 2011/0064648 A1 | 3/2011 | Preston et al. | WO | 2008/058636 | 5/2008 |
| 2011/0088896 A1 | 4/2011 | Preston | WO | WO 2008/073889 | 6/2008 |
| 2011/0088897 A1 | 4/2011 | Raman | WO | 2008/087154 | 7/2008 |
| 2011/0146978 A1 | 6/2011 | Perlman | WO | 2009/018053 | 2/2009 |
| 2011/0146979 A1 | 6/2011 | Wallace | WO | WO 2009/018053 | 2/2009 |
| | | | WO | WO 2009/048723 | 4/2009 |
| FOREIGN PATENT DOCUMENTS | | | WO | WO 2009/048724 | 4/2009 |
| CA | 1003217 | 1/1977 | WO | WO 2009/086361 | 7/2009 |
| CA | 1106178 | 8/1981 | WO | WO 2009/086362 | 7/2009 |
| CA | 1 125 026 | 6/1982 | WO | WO 2009/086363 | 7/2009 |
| CA | 1187702 | 6/1985 | WO | WO 2009/086366 | 7/2009 |
| CN | 1477090 | 2/2004 | WO | WO 2009/086367 | 7/2009 |
| DE | 2 210 891 | 3/1972 | WO | WO 2009/086370 | 7/2009 |
| DE | 2210891 | 9/1972 | WO | WO 2009/086372 | 7/2009 |
| DE | 2852710 | 6/1980 | WO | WO 2009/086374 | 7/2009 |
| DE | 3422202 | 12/1985 | WO | WO 2009/086377 | 7/2009 |
| DE | 100610607 | 6/2002 | WO | WO 2009/086383 | 7/2009 |
| EP | 0024792 | 3/1981 | WO | WO 2009/086407 | 7/2009 |
| EP | 0 067 580 | 12/1982 | WO | WO 2009/086408 | 7/2009 |
| EP | 102828 | 3/1984 | WO | WO 2009/111330 | 9/2009 |
| EP | 0 138 463 | 4/1985 | WO | WO 2009/111331 | 9/2009 |

| | | |
|---|---|---|
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | 2011/063608 | 6/2011 |

OTHER PUBLICATIONS

U.S. Appl. No. 12/778,548, filed May 12, 2010, Robinson, et al.
U.S. Appl. No. 12/778,552, filed May 12, 2010, Robinson, et al.
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.
Demibras, "Demineralization of Agricultural Residues by Water Leaching", *Energy Sources*, vol. 25, pp. 679-687, (2003).
Gas separation, http://en.wikipedia.org/wiki/Gas_separation, pp. 1-2.
Gallagher Jr., et al., "Catalytic Coal Gasification for SNG Manufacture", *Energy Research*, vol. 4, pp. 137-147, (1980).
Heinemann, et al., "Fundamental and Exploratory Studies of Catalytic Steam Gasification of Carbonaceous Materials", Final Report Fiscal Years 1985-1994.
Jensen, et al. Removal of K and Cl by leaching of straw char', *Biomass and Bioenergy*, vol. 20, pp. 447-457, (2001).
Meyers, et al. Fly Ash as a Construction Material for Highways, A Manual. Federal Highway Administration, Report No. FHWA-IP-76-16, Washington, DC, 1976.
Natural Gas Processing: The Crucial Link Between Natural Gas Production and Its Transportation to Market. Energy Information Administration, Office of Oil and Gas; pp. 1-11, (2006).
Prins, et al., "Exergetic optimisation of a production process of Fischer-Tropsch fuels from biomass", *Fuel Processing Technology*, vol. 86, pp. 375-389, (2004).
Moulton, Lyle K. "Bottom Ash and Boiler Slag", *Proceedings of the Third International Ash Utilization Symposium*, U.S. Bureau of Mines, Information Circular No. 8640, Washington, DC, 1973.
Asami, K., et al., "Highly Active Iron Catalysts from Ferric Chloride or the Steam Gasification of Brown Coal," ind. Eng. Chem. Res., vol. 32, No. 8, 1993, pp. 1631-1636.
Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.

Brown et al., "Biomass-Derived Hydrogen From a Thermally Ballasted Gasifier," Aug. 2005.
Brown et al., "Biomass-Derived Hydrogen From a Thermally Ballasted Gasifier," DOE Hydrogen Program Contractors' Review Metting, Center for Sustainable Environmental Technologies, Iowa State University, May 21, 2003.
Cohen, S.J., Project Manager, "Large Pilot Plant Alternatives for Scaleup of the Catalytic Coal Gasification Process," FE-2480-20, U.S. Dept. of Energy, Contract No., EX-76-C-01-2480, 1979.
Euker, Jr., C.A., Reitz, R.A., Program Managers, "Exxon Catalytic Coal-Gasification-Process Development Program," Exxon Research & Engineering Company, FE-2777-31, U.S. Dept. Of Energy, Contract No. ET-78-C-01-2777, 1981.
Kalina, T., Nahas, N.C., Project Managers, "Exxon Catalytic Coal Gasification Process Predevelopment Program," Exxon Research & Engineering Company, FE-2369-24, U.S. Dept. of Energy, Contract No., E(49-18)-2369, 1978.
Nahas, N.C., "Exxon Catalytic Coal Gasification Process—Fundamentals to Flowsheets," Fuel, vol. 62, No. 2, 1983, pp. 239-241.
Ohtsuka, Y. et al., "Highly Active Catalysts from Inexpensive Raw Materials for Coal Gasification," Catalysis Today, vol. 39, 1997, pp. 111-125.
Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.
Ohtsuka, Yasuo et al., "Calcium Catalysed Steam Gasification of Yalourn Brown Coal," Fuel, vol. 65, 1986, pp. 1653-1657.
Ohtsuka, Yasuo, et al, "Iron-Catalyzed Gasification of Brown Coal at Low Temperatures," Energy & Fuels, vol. 1, No. 1, 1987, pp. 32-36.
Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.
Ohtsuka, Yasuo et al., "Steam Gasification of Coals with Calcium Hydroxide," Energy & Fuels, vol. 9, No. 6, 1995, pp. 1038-1042.
Pereira, P., et al., "Catalytic Steam Gasification of Coals," Energy & Fuels, vol. 6, No. 4, 1992, pp. 407-410.
Ruan Xiang-Quan, et al., "Effects of Catalysis on Gasification of Tatong Coal Char," Fuel, vol. 66, Apr. 1987, pp. 568-571.
Tandon, D., "Low Temperature and Elevated Pressure Steam Gasification of Illinois Coal," College of Engineering in the Graduate School, Southern Illinois university at Carbondale, Jun. 1996.
A.G. Collot et al., "Co-pyrolysis and co-gasification of coal and biomass in bench-scale fixed-bed and fluidized bed reactors", (1999) Fuel 78, pp. 667-679.
Wenkui Zhu et al., "Catalytic gasification of char from co-pyrolysis of coal and biomass", (2008) Fuel Processing Technology, vol. 89, pp. 890-896.
Chiesa P. et al., "Co-Production of hydrogen, electricity and C02 from coal with commercially ready technology. Part A: Performance and emissions", (2005) International Journal of Hydrogen Energy, vol. 30, No. 7, pp. 747-767.
Brown et al., "Biomass-Derived Hydrogen From a Thermally Ballasted Gasifier", DOE Hydrogen Program Contractors' Review meeting, May 18-21, 2003, Center for Sustainable Environmental Technologies Iowa State University.
Brown et al., "Biomass-Derived Hydrogen From a thermally Ballasted Gasifier", Final Technical Report, Iowa State University, Aug. 2005.
Chiaramonte et al, "Upgrade Coke by Gasification", (1982) Hydrocarbon Processing, vol. 61 (9), pp. 255-257 (Abstract only).

PROCESSES FOR HYDROMETHANATION OF A CARBONACEOUS FEEDSTOCK

CROSS REFERENCE TO RELATED APPLICATION

This application claims priority under 35 U.S.C. §119 from U.S. Provisional Application Ser. No. 61/177,848 (filed 13 May 2009), the disclosure of which is incorporated by reference herein for all purposes as if fully set forth.

FIELD OF THE INVENTION

The present invention relates to processes for preparing gaseous products, and in particular methane, via the hydromethanation of carbonaceous feedstocks in the presence of steam, carbon monoxide, hydrogen, oxygen and a hydromethanation catalyst.

BACKGROUND OF THE INVENTION

In view of numerous factors such as higher energy prices and environmental concerns, the production of value-added gaseous products from lower-fuel-value carbonaceous feedstocks, such as petroleum coke, coal and biomass, is receiving renewed attention. The catalytic gasification of such materials to produce methane and other value-added gases is disclosed, for example, in U.S. Pat. Nos. 3,828,474, 3,998,607, 4,057,512, 4,092,125, 4,094,650, 4,204,843, 4,468,231, 4,500,323, 4,541,841, 4,551,155, 4,558,027, 4,606,105, 4,617,027, 4,609,456, 5,017,282, 5,055,181, 6,187,465, 6,790,430, 6,894,183, 6,955,695, US2003/0167961A1, US2006/0265953A1, US2007/000177A1, US2007/083072A1, US2007/0277437A1 and GB1599932.

In general, carbonaceous materials, such as coal, biomass and/or petroleum coke, can be converted to a plurality of gases, including value-added gases such as methane, by the reaction of the material in the presence of a catalyst source and steam at elevated temperatures and pressures. Fine unreacted carbonaceous materials are removed from the raw gas product, and the gases are cooled and scrubbed in multiple processes to remove undesirable contaminants and other side-products including carbon monoxide, hydrogen, carbon dioxide and hydrogen sulfide, to produce a methane product stream.

The hydromethanation of a carbon source to methane typically involves four separate reactions:

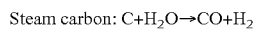
Steam carbon: $C+H_2O \rightarrow CO+H_2$      (I)

Water-gas shift: $CO+H_2O \rightarrow H_2+CO_2$      (II)

CO Methanation: $CO+3H_2 \rightarrow CH_4+H_2O$      (III)

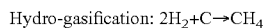
Hydro-gasification: $2H_2+C \rightarrow CH_4$      (IV)

In the hydromethanation reaction, the result is a "direct" methane-enriched raw product gas stream, which can be subsequently purified and further methane-enriched to provide the final methane product. This is distinct from conventional gasification processes, such as those based on partial combustion/oxidation of a carbon source, where a syngas (carbon monoxide+hydrogen) is the primary product (little or no methane is directly produced), which can then be further processed to produce methane (via catalytic methanation, see reaction (III)) or any number of other higher hydrocarbon products. When methane is the desired end-product, the hydromethanation reaction provides the possibility for increased efficiency and lower methane cost than traditional gasification processes.

In the hydromethanation reaction, the first three reactions (I-III) predominate to result in the following overall reaction:

$2C+2H_2O \rightarrow CH_4+CO_2$      (V).

The overall reaction is essentially thermally balanced; however, due to process heat losses and other energy requirements (such as required for evaporation of moisture entering the reactor with the feedstock), some heat must be added to maintain the thermal balance.

The reactions are also essentially syngas (hydrogen and carbon monoxide) balanced (syngas is produced and consumed); therefore, as carbon monoxide and hydrogen are withdrawn with the product gases, carbon monoxide and hydrogen need to be added to the reaction as required to avoid a deficiency.

In order to maintain the net heat of reaction as close to neutral as possible (only slightly exothermic or endothermic), and maintain the syngas balance, a superheated gas stream of steam, carbon monoxide and hydrogen is often fed to the hydromethanation reactor. Frequently, the carbon monoxide and hydrogen streams are recycle streams separated from the product gas, and/or are provided by reforming a portion of the product methane. See, for example, U.S. Pat. Nos. 4,094,650, 6,955,595 and US2007/083072A1.

Gas recycle loops generally require at least additional heating elements (fired superheaters) and pressurization elements to bring the recycle gas stream to a temperature and pressure suitable for introduction into the hydromethanation reactor. Further, the separation of the recycle gases from the methane product, for example by cryogenic distillation, and the reforming of the methane product, greatly increase the engineering complexity and overall cost of producing methane, and decrease the overall system efficiency.

Steam generation is another area that can increase the engineering complexity of the overall system. The use of externally fired boilers, for example, can greatly decrease overall system efficiency.

Therefore, a need remains for improved hydromethanation processes where gas recycle loops are minimized and/or eliminated, and steam is generated efficiently, to decrease the complexity and cost of producing methane.

SUMMARY OF THE INVENTION

In one aspect, the invention provides a process for generating a plurality of gaseous products from a carbonaceous feedstock, and generating a methane product stream, the process comprising the steps of:

(a) supplying a first carbonaceous feedstock, a first oxygen-rich gas stream and, optionally, an aqueous stream comprising one or both of water and steam, to a syngas generator;

(b) reacting the first carbonaceous feedstock in the presence of oxygen and, optionally, the aqueous stream, in the syngas generator, at a first temperature and a first pressure, to produce a first gas stream comprising hydrogen, carbon monoxide and, optionally, steam;

(c) cooling the first gas stream, optionally with a quench stream comprising one or both of water and steam, to generate a cooled first gas stream comprising hydrogen, carbon monoxide and steam at a second temperature and a second pressure;

(d) introducing a second carbonaceous feedstock, a hydromethanation catalyst, a second oxygen-rich gas stream and the cooled first gas stream to a hydromethanation reactor, the second carbonaceous feedstock comprising a carbon content;

(e) reacting a portion of the carbon content from the second carbonaceous feedstock in the hydromethanation reactor in the presence of oxygen to produce carbon monoxide, hydrogen and heat energy;

(f) reacting the second carbonaceous feedstock in the hydromethanation reactor in the presence of carbon monoxide, hydrogen, steam and hydromethanation catalyst, at a third temperature and a third pressure, to produce a methane-enriched raw product stream comprising methane, carbon monoxide, hydrogen and carbon dioxide;

(g) withdrawing the methane-enriched product stream from the hydromethanation reactor; and (h) treating the methane-enriched product stream to generate the methane product stream.

The processes in accordance with the present invention are useful, for example, for producing methane from various carbonaceous feedstocks.

A specific embodiment is one which produces a product stream of "pipeline-quality natural gas".

Another specific embodiment is one in which the process is a continuous process, in which steps (a-h) above are operated in a continuous manner.

Another specific embodiment is one which is a once-through process, in which the hydromethanation reaction has a syngas (carbon monoxide and hydrogen) demand, and the syngas demand is satisfied through the combination of the syngas generator and the reaction of step (e), such that no recycle of carbon monoxide or hydrogen from the methane-enriched raw product stream is required. In other words, the syngas (carbon monoxide and hydrogen) demand (requirements) of the hydromethanation reaction are fully satisfied in part by the syngas generator (for example, an oxygen-blown gasifier), and in part in situ by the partial oxidation/combustion of carbon in the hydromethanation reactor (in the presence of oxygen).

Another specific embodiment is one in which the amount of the second oxygen-rich stream introduced into the hydromethanation reactor is varied as a process control, for example, to assist control of the third temperature. The amount of oxygen supplied to the hydromethanation reactor can be increased or decreased to increase the amount of carbon being consumed in the hydromethanation reactor.

Another specific embodiment is one in which carbon fuel fired superheaters are desirably eliminated from the processes, since the first gas stream (including superheated steam) as supplied to the hydromethanation reactor may be superheated to a desired temperature and pressure through one or more stages of process heat recovery, and/or through additional process heat supplied via the syngas generator mentioned above. Additional heat required for the hydromethanation reactor is generated in situ in the hydromethanation reactor as mentioned above. This combination of the heat energy supplied by the syngas generator and the in situ heat generation is substantially sufficient to meet the heat demand of the hydromethanation reaction.

Another specific embodiment is one in which a char by-product is produced in steps (e) and (f), wherein the char by-product is periodically or continuously withdrawn from the hydromethanation reactor, and at least a portion of the withdrawn by-product char is provided to a catalyst recovery operation. Recovered catalyst is then recycled and combined with makeup catalyst to meet the demands of the hydromethanation reaction.

Another specific embodiment is one in which a char by-product is generated in steps (e) and (f), the hydromethanation reactor comprises a collection zone where the char by-product collects, and the second oxygen-rich gas stream is introduced into this collection zone of the hydromethanation reactor. As the by-product char comprises carbon content from the carbonaceous feedstock, the char carbon is desirably preferentially consumed.

Another specific embodiment is one wherein the process has a steam demand that is substantially met (or exceeded) by process steam generated from process heat recovery.

Another specific embodiment is one in which the methane-enriched raw product stream is further treated, and the process comprises the further steps of:

(i) recovering at least portion of the heat energy from the methane-enriched raw product stream to produce a cooled methane-enriched raw product stream and, optionally, utilizing the recovered heat energy to generate process steam;

(j) optionally recovering ammonia, if any, from the cooled methane-enriched raw product stream;

(k) in the event that the molar ratio of hydrogen to carbon monoxide in the cooled methane-enriched raw product stream is less than about 3:1, optionally sour shifting a portion of the carbon monoxide in the cooled methane-enriched raw product stream to generate heat energy and a hydrogen-enriched second gas stream having a molar ratio of hydrogen to carbon monoxide of at least about 3:1;

(l) optionally recovering a portion of the heat energy from step (k), if present, wherein at least a portion of the recovered heat energy is utilized to generate process steam;

(m) optionally reacting at least a portion of the carbon monoxide and at least a portion of the hydrogen present in the cooled methane-enriched raw product stream in a catalytic methanator in the presence of a sulfur-tolerant methanation catalyst to produce a methane-enriched second gas stream;

(n) optionally recovering a portion of the heat energy from step (m), if present, wherein a least a portion of the recovered heat energy is utilized to generate process steam;

(o) removing a substantial portion of the carbon dioxide and a substantial portion of the hydrogen sulfide from the cooled methane-enriched raw product stream to produce a sweetened gas stream comprising a substantial portion of the methane from the cooled methane-enriched raw product stream;

(p) optionally separating at least a portion of hydrogen from the sweetened gas stream to produce a hydrogen-depleted third gas stream;

(q) optionally reacting carbon monoxide and hydrogen present in the sweetened gas stream in a catalytic methanator in the presence of a methanation catalyst to produce heat energy and a methane-enriched sweetened gas stream;

(r) optionally recovering a portion of the heat energy from step (q), wherein at least a portion of the recovered heat energy is utilized to generate process steam; and (s) recovering at least a portion of the methane-enriched sweetened gas stream.

These and other embodiments, features and advantages of the present invention will be more readily understood by those of ordinary skill in the art from a reading of the following detailed description.

DETAILED DESCRIPTION

Figure 1:
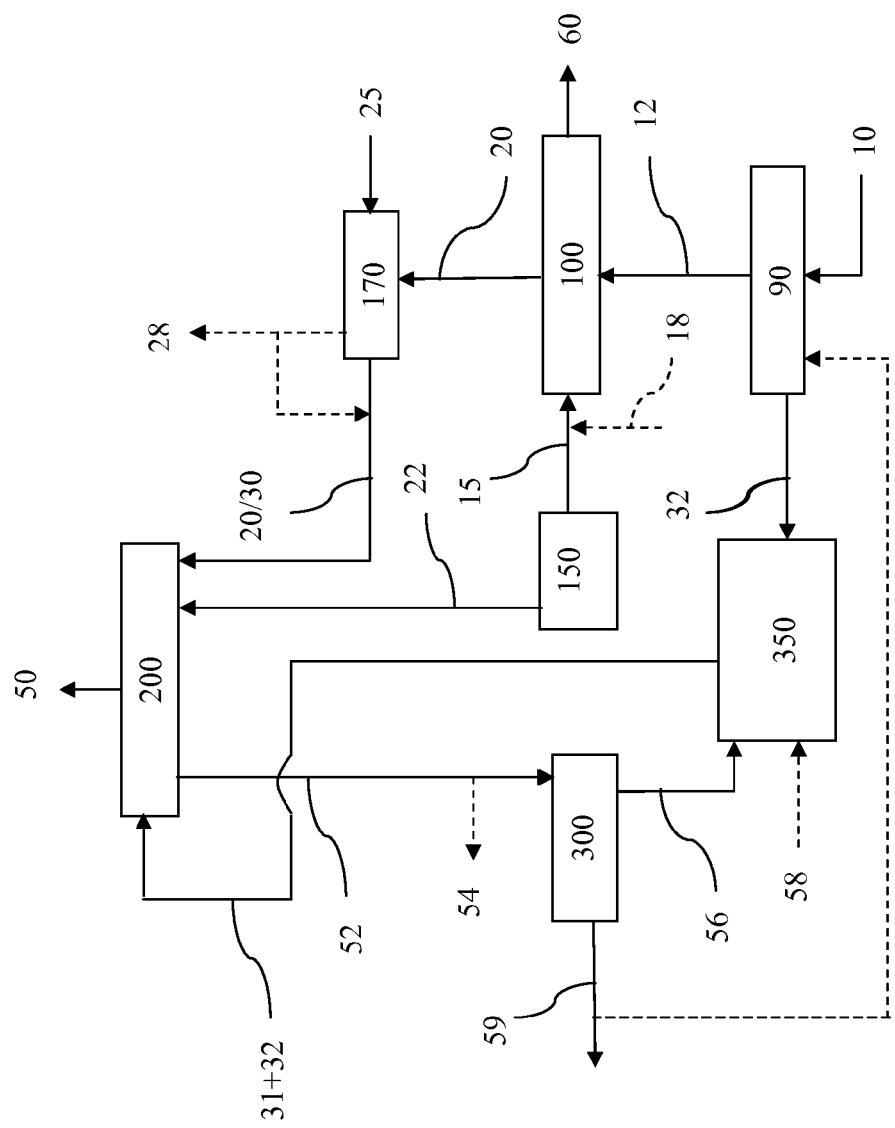
FIG. 1 is a diagram of an embodiment of a hydromethanation process in accordance with the present invention whereby a methane-enriched raw product stream is produced from a carbonaceous feedstock.

The present disclosure relates to processes to convert a carbonaceous feedstock into a plurality of gaseous products including at least methane, the processes comprising, among other steps, providing a carbonaceous feedstock, an oxygen-rich gas stream, a syngas stream (hydrogen and carbon monoxide) from a syngas generator, a hydromethanation catalyst and steam to a hydromethanation reactor to convert the carbonaceous feedstock in the presence of hydromethanation catalyst, carbon monoxide, hydrogen, oxygen and steam into the plurality of gaseous products.

The present invention can be practiced in conjunction with the subject matter disclosed in commonly-owned US2007/0000177A1, US2007/0083072A1, US2007/0277437A1, US2009/0048476A1, US2009/0090055A1, US2009/0090056A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165384A1, US2009/0217582A1, US2009/0260287A1, US2009/0220406A1, US2009/0217590A1, US2009/0217586A1, US2009/0217588A1, US2009/0218424A1, US2009/0217589A1, US2009/0217575A1, US2009/0229182A1, US2009/0217587A1, US2009/0259080A1, US2009/0246120A1, US2009/0324458A1, US2009/0324459A1, US2009/0324460A1, US2009/0324461A1, US2009/0324462A1, US2010/0076235A1 and WO2010/033846A2.

Moreover, the present invention can be practiced in conjunction with the subject matter disclosed in commonly-owned U.S. patent application Ser. No. 12/648,469 (entitled PROCESS FOR PREPARING A CATALYZED CARBONACEOUS FEEDSTOCK) and Ser. No. 12/648,471 (entitled PROCESS FOR PREPARING A CATALYZED CARBONACEOUS FEEDSTOCK), each of which was filed on 29 Dec. 2009.

All publications, patent applications, patents and other references mentioned herein, including but not limited to those referenced above, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Although methods and materials similar or equivalent to those described herein can be used in the practice or testing of the present disclosure, suitable methods and materials are described herein.

Unless stated otherwise, all percentages, parts, ratios, etc., are by weight.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "substantial portion", as used herein, unless otherwise defined herein, means that greater than about 90% of the referenced material, preferably greater than 95% of the referenced material, and more preferably greater than 97% of the referenced material. The percent is on a molar basis when reference is made to a molecule (such as methane, carbon dioxide, carbon monoxide and hydrogen sulfide), and otherwise is on a weight basis (such as for entrained carbonaceous fines).

The term "carbonaceous material" as used herein can be, for example, biomass and non-biomass materials as defined herein.

The term "biomass" as used herein refers to carbonaceous materials derived from recently (for example, within the past 100 years) living organisms, including plant-based biomass and animal-based biomass. For clarification, biomass does not include fossil-based carbonaceous materials, such as coal. For example, see previously incorporated US2009/0217575A1, US2009/0229182A1 and US2009/0217587A1.

The term "plant-based biomass" as used herein means materials derived from green plants, crops, algae, and trees, such as, but not limited to, sweet sorghum, bagasse, sugarcane, bamboo, hybrid poplar, hybrid willow, albizia trees, eucalyptus, alfalfa, clover, oil palm, switchgrass, sudangrass, millet, jatropha, and miscanthus (e.g., *Miscanthus×giganteus*). Biomass further include wastes from agricultural cultivation, processing, and/or degradation such as corn cobs and husks, corn stover, straw, nut shells, vegetable oils, canola oil, rapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

The term "non-biomass", as used herein, means those carbonaceous materials which are not encompassed by the term "biomass" as defined herein. For example, non-biomass include, but is not limited to, anthracite, bituminous coal, sub-bituminous coal, lignite, petroleum coke, asphaltenes, liquid petroleum residues or mixtures thereof. For example, see previously incorporated US2009/0166588A1, US2009/

0165379A1, US2009/0165380A1, US2009/0165361A1, US2009/0217590A1 and US2009/0217586A1.

The terms "petroleum coke" and "petcoke" as used here includes both (i) the solid thermal decomposition product of high-boiling hydrocarbon fractions obtained in petroleum processing (heavy residues—"resid petcoke"); and (ii) the solid thermal decomposition product of processing tar sands (bituminous sands or oil sands—"tar sands petcoke"). Such carbonization products include, for example, green, calcined, needle and fluidized bed petcoke.

Resid petcoke can also be derived from a crude oil, for example, by coking processes used for upgrading heavy-gravity residual crude oil, which petcoke contains ash as a minor component, typically about 1.0 wt % or less, and more typically about 0.5 wt % of less, based on the weight of the coke. Typically, the ash in such lower-ash cokes comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes comprises materials such as silica and/or alumina.

Petroleum coke has an inherently low moisture content, typically, in the range of from about 0.2 to about 2 wt % (based on total petroleum coke weight); it also typically has a very low water soaking capacity to allow for conventional catalyst impregnation methods. The resulting particulate compositions contain, for example, a lower average moisture content which increases the efficiency of downstream drying operation versus conventional drying operations.

The petroleum coke can comprise at least about 70 wt % carbon, at least about 80 wt % carbon, or at least about 90 wt % carbon, based on the total weight of the petroleum coke. Typically, the petroleum coke comprises less than about 20 wt % inorganic compounds, based on the weight of the petroleum coke.

The term "asphaltene" as used herein is an aromatic carbonaceous solid at room temperature, and can be derived, from example, from the processing of crude oil and crude oil tar sands.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on the total coal weight. Examples of useful coal include, but are not limited to, Illinois #6, Pittsburgh #8, Beulah (ND), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art. See, for example, "Coal Data: A Reference", Energy Information Administration, Office of Coal, Nuclear, Electric and Alternate Fuels, U.S. Department of Energy, DOE/EIA-0064(93), February 1995.

The ash produced from combustion of a coal typically comprises both a fly ash and a bottom ash, as are familiar to those skilled in the art. The fly ash from a bituminous coal can comprise from about 20 to about 60 wt % silica and from about 5 to about 35 wt % alumina, based on the total weight of the fly ash. The fly ash from a sub-bituminous coal can comprise from about 40 to about 60 wt % silica and from about 20 to about 30 wt % alumina, based on the total weight of the fly ash. The fly ash from a lignite coal can comprise from about 15 to about 45 wt % silica and from about 20 to about 25 wt % alumina, based on the total weight of the fly ash. See, for example, Meyers, et al. "Fly Ash. A Highway Construction Material," Federal Highway Administration, Report No. FHWA-IP-76-16, Washington, D.C., 1976.

The bottom ash from a bituminous coal can comprise from about 40 to about 60 wt % silica and from about 20 to about 30 wt % alumina, based on the total weight of the bottom ash. The bottom ash from a sub-bituminous coal can comprise from about 40 to about 50 wt % silica and from about 15 to about 25 wt % alumina, based on the total weight of the bottom ash. The bottom ash from a lignite coal can comprise from about 30 to about 80 wt % silica and from about 10 to about 20 wt % alumina, based on the total weight of the bottom ash. See, for example, Moulton, Lyle K. "Bottom Ash and Boiler Slag," Proceedings of the Third International Ash Utilization Symposium, U.S. Bureau of Mines, Information Circular No. 8640, Washington, D.C., 1973.

The term "unit" refers to a unit operation. When more than one "unit" is described as being present, those units are operated in a parallel fashion. A single "unit", however, may comprise more than one of the units in series. For example, an acid gas removal unit may comprise a hydrogen sulfide removal unit followed in series by a carbon dioxide removal unit. As another example, a trace contaminant removal unit may comprise a first removal unit for a first trace contaminant followed in series by a second removal unit for a second trace contaminant. As yet another example, a methane compressor unit may comprise a first methane compressor to compress the methane product stream to a first pressure, followed in series by a second methane compressor to further compress the methane product stream to a second (higher) pressure.

The term "syngas demand" refers to the maintenance of syngas balance in the hydromethanation reactor. As discussed above, in the overall desirable steady-state hydromethanation reaction (see equations (I), (II) and (III) above), hydrogen and carbon monoxide are generated and consumed in balance. Because both hydrogen and carbon monoxide are withdrawn as part of the gaseous products, however, hydrogen and carbon monoxide must be added to the hydromethanation reactor or generated in situ in an amount at least required to maintain this reaction balance. The amount of hydrogen and carbon monoxide that must consequently be added (or generated in situ) is the "syngas demand".

The term "steam demand" refers to the amount of steam that must be added to the hydromethanation reactor. Steam is consumed in the hydromethanation reaction and must be added to the hydromethanation reactor. The theoretical consumption of steam is two moles for every two moles of carbon in the feed to produce one mole of methane and one mole of carbon dioxide (see equation (V)). In actual practice, the steam consumption is not perfectly efficient and steam is withdrawn with the product gases; therefore, a greater than theoretical amount of steam needs to be added to the hydromethanation reactor, which amount is the "steam demand". The amount of steam to be added (and the source) is discussed in further detail below.

The term "heat demand" refers to the amount of heat energy that must be added to the hydromethanation reactor (and/or generated in situ) to keep the reaction of step (f) in thermal balance, as discussed above and as further detailed below.

The materials, methods, and examples herein are illustrative only and, except as specifically stated, are not intended to be limiting.

General Process Information

In one embodiment of the invention, a methane-enriched raw product stream (50) can be generated from a carbonaceous feedstock as illustrated in FIG. 1.

A first carbonaceous feedstock (12), a first oxygen-rich gas stream (15) (such as purified oxygen) and an optional aqueous (water/steam) stream (18) are provided to a syngas generator (100).

The syngas generator (100) is typically a partial oxidation/combustion gasification reactor (such as an oxygen-blown gasifier) in which the first carbonaceous feedstock (12) can be gasified (e.g., at least partially oxidized/combusted), under suitable temperature and pressure, to generate a first gas stream (20) comprising carbon monoxide and hydrogen. The first gas stream (20) will also comprise steam if aqueous stream (18) is provided, and/or if the first carbonaceous feedstock (12) has a water content, such as in the form of an aqueous slurry. As described generally above, and more particularly below, the first gas stream (20) is used as an input for a hydromethanation process.

The reaction in the syngas generator (100) is typically an uncatalyzed reaction, that is, the reaction requires no added gasification catalyst, but a catalyst that promotes syngas formation may be utilized.

In certain embodiments of the invention, the hydrogen and carbon monoxide are present in the first gas steam (20) in a molar ratio of about 3:1 or higher.

A second carbonaceous feedstock (32), a hydromethanation catalyst (31), a second oxygen-rich gas stream (22) and at least a portion of the first gas stream (20) (and steam in the event that the first gas stream (20) does not contain sufficient steam) are provided to a hydromethanation reactor (200) that is in communication with the syngas generator (100). The second carbonaceous feedstock (32), carbon monoxide, hydrogen, steam and oxygen are reacted in the hydromethanation reactor (200) in the presence of a hydromethanation catalyst (31), and under suitable pressure and temperature conditions, to form a methane-enriched raw product stream (50) comprising methane and a plurality of other gaseous products typically including carbon dioxide, hydrogen and carbon monoxide, as well as steam and certain contaminants (such as hydrogen sulfide) primarily depending on the particular feedstock utilized.

The first and second carbonaceous feedstocks (12, 32) are derived from one or more carbonaceous materials (10), which are processed in a feedstock preparation section (90) as discussed below. The second carbonaceous feedstock (32) can be from the same or different carbonaceous material(s) as the first carbonaceous feedstock (12).

The hydromethanation catalyst (31) can comprise one or more catalyst species, as discussed below.

The second carbonaceous feedstock (32) and the gasification catalyst (31) can be intimately mixed (i.e., to provide a catalyzed second carbonaceous feedstock) before provision to the hydromethanation reactor (200).

The reactors (i.e., hydromethanation reactors and syngas generators) for the present processes are typically operated at high or moderately high pressures and temperatures (with the syngas generator typically being operated at a higher pressure and temperature than the hydromethanation reactor), requiring introduction of the appropriate carbonaceous feedstock to a reaction chamber of the reactor while maintaining the required temperature, pressure and flow rate of the feedstock. Those skilled in the art are familiar with feed inlets to supply the carbonaceous feedstock into the reaction chambers having high pressure and/or temperature environments, including star feeders, screw feeders, rotary pistons and lock-hoppers. It should be understood that the feed inlets can include two or more pressure-balanced elements, such as lock hoppers, which would be used alternately. In some instances, the carbonaceous feedstock can be prepared at pressure conditions above the operating pressure of the reactor and, hence, the particulate composition can be directly passed into the reactor without further pressurization.

Any of several types of gasification reactors can be utilized for either the hydromethanation reactor or the syngas generator. Suitable gasification reactors include those having a reaction chamber which is a counter-current fixed bed, a co-current fixed bed, a fluidized bed, or an entrained flow or moving bed reaction chamber. The hydromethanation reactor is typically a fluidized bed reactor.

Gasification—Syngas Generator (100)

In the syngas generator (100), the first carbonaceous feedstock (12) is gasified (partially oxidized or combusted), under suitable temperature and pressure conditions to generate the first gas stream (20).

The gasification in the syngas generator (100) will typically occur in a fluidized bed of the carbonaceous feedstock that is fluidized by the upward flow of the oxygen-rich stream (15) and optional steam from the aqueous stream (18).

Typically, the gasification in the syngas generator (100) is a non-catalytic process, so no gasification catalyst needs to be added to the first carbonaceous feedstock (12) or into the syngas generator (100).

Generally, the syngas generator (100) is operated under non-slagging conditions to minimize the passing of ash by-product and other contaminants into the hydromethanation reactor (200). The operating temperature (i.e., the first temperature) in a non-slagging regime thus will be below the ash fusion point of the ash in the first carbonaceous feedstock (12), which can readily be determined by a person of ordinary skill in the relevant art, but above the temperature in the hydromethanation reactor (200). Typically, in a non-slagging operating regime, the syngas generator (100) will be operated at least about 100° F. (at least about 56° C.), or at least about 150° F. (at least about 83° C.), or at least about 200° F. (at least about 111° C.), below such ash fusion point. For example, for a feedstock having an ash fusion point of about 1800° F. (about 982° C.), the syngas generator (100) would be operated at about 1700° F. (about 927° C.) or less.

In certain embodiments, however, the syngas generator (100) may be operated under slagging conditions, for example, when higher temperatures and pressures are required in the hydromethanation reactor (200) than can be provided by a non-slagging regime. Under slagging conditions, the syngas generator (100) will be operated at a temperature above the ash fusion point of the ash in the first carbonaceous feedstock (12), which can readily be determined by a person of ordinary skill in the relevant art. Typically, in a slagging regime, the syngas generator (100) will be operated at least about 100° F. (at least about 56° C.), or at least about 150° F. (at least about 83° C.), or at least about 200° F. (at least about 111° C.), above such ash fusion point. For example, for a feedstock having an ash fusion point of about 1800° F. (about 982° C.), the gasification zone would be operated at about 1900° F. (about 1038° C.) or more.

Additionally, the syngas generator (100) is typically operated at a temperature of at least about 250° F. (at least about 139° C.), or at least about 350° F. (at least about 194° C.), or at least about 450° F. (at least about 250° C.), or at least about 500° F. (at least about 278° C.), higher than the hydromethanation reactor (200). That is, the first temperature is at least about 250° F. (at least about 139° C.), or at least about 350° F. (at least about 194° C.), or at least about 450° F. (at least about 250° C.), or at least about 500° F. (at least about 278° C.), higher than the third temperature The syngas generator (100) will also typically be operated at a higher pressure than the hydromethanation reactor (200) so that the first gas stream (20) can be fed to the hydromethanation reactor (200) without additional pressurization, even with intermediate processing. Typically, the pressure in the syngas generator (100) will be at least about 50 psi (about 345 kPa), or at least about 100 psi (about 690 kPa), or at least about 200 psi (about 1379 kPa), higher than the pressure in the hydromethanation reactor (200). That is, the first pressure is at least about 50 psi (about 345 kPa), or at least about 100 psi (about 690 kPa), or at least about 200 psi (about 1379 kPa), higher than the third pressure.

The temperature in the syngas generator (100) can be controlled, for example, by controlling the amount of oxygen, as well as the amount and temperature of steam, supplied to syngas generator (100).

The first oxygen-rich gas stream (15) can be fed into the syngas generator (100) by any suitable means such as direct injection of purified oxygen, oxygen-air mixtures, oxygen-steam mixtures or oxygen-inert gas mixtures into the reactor bottom. See, for instance, U.S. Pat. No. 4,315,753 and Chiaramonte et al., Hydrocarbon Processing, September 1982, pp. 255-257. The first oxygen-rich gas stream (15) is typically generated via standard air-separation technologies, represented by air separation unit (150), and is typically fed as a high-purity oxygen stream (about 95% or greater volume percent oxygen).

The steam stream (18) and the first oxygen-rich gas stream (15) may be provided via a single stream or separate streams, and are generally provided at a temperature of from about 400° F. (about 204° C.), or from about 450° F. (about 232° C.), or from about 500° F. (about 260° C.), to about 750° F. (about 399° C.), or to about 700° F. (about 371° C.), or to about 650° F. (about 343° C.), and at a pressure at least slightly higher than present in the syngas generator (100). Generally, the first oxygen-rich gas stream (15) can be introduced as an admixture with steam (the aqueous stream (18)) into the reaction zone in order to assist in pressurization, fluidization and the partial combustion of carbonaceous feedstock particles, and to avoid formation of hot spots.

In the event that the first gas stream (20) exiting from the syngas generator (100) is at too high a temperature for the direct use in the hydromethanation process, which will generally be the case, the first gas stream (20) can be fed to a heat exchanger (170). Typically, the heat exchanger (170) will be used to recover heat from the first gas stream (20) to generate process steam (28), which can be fed to the hydromethanation reactor (200) and/or used elsewhere in the process.

In one embodiment, the heat exchanger (170) is a quench zone where an aqueous quench stream (25) comprising water and/or steam is contacted with the first gas stream (20) to adjust the first gas stream (20) to the appropriate temperature, steam content and other conditions required for the hydromethanation reaction, resulting in a quenched first gas stream (30). This quenching may also assist with particulate/contaminant control as discussed in more detail below.

Because the syngas generator (100) and heat exchanger (170) can produce the first gas stream (20) (including steam) of an appropriate temperature and pressure for feeding the hydromethanation reactor (200), the use of a separate superheater, as disclosed in many of the previously-incorporated references, can advantageously be eliminated.

In addition to hydrogen, carbon monoxide and optional steam, the first gas stream (20) exiting syngas generator (100) can include entrained particulates or molten slag, particularly when the syngas generator (100) is operated under slagging conditions. These particulates (including ash, char, carbonaceous fines, etc.) and slag (including molten ash and metallic components) are usually generated during partial combustion of the first carbonaceous feedstock in the syngas generator (100). The particulates and molten slag can interfere with the hydromethanation process and downstream equipment; therefore, in some embodiments of the invention, a capture device (not depicted), such as a high-temperature filter device, is provided between the syngas generator (100) and the heat exchanger (170) and/or hydromethanation reactor (200) to remove a substantial portion or all of the particulates and slag present in part or all of the first gas stream (20) prior its introduction into hydromethanation reactor (200). Suitable removal devices include, without limitation, high temperature resistant screen mesh materials known in the art, and filters, including for example ceramic and high-temperature resistant metallic filters.

As indicated above, the quenching of first gas stream (20) with an aqueous quench stream (25) can assist in cleaning the first gas stream (20) of undesirable particulates and/or molten slag through, for example, temperature and/or gas velocity reduction.

Also, in addition to hydrogen, carbon monoxide and superheated steam, the first gas stream may contain other gases resulting from the reactions and/or fluidization conditions in the syngas generator (100), such as carbon dioxide. Because the gasification in the syngas generator (100) typically produces little or no methane directly, the first gas stream (20) will contain little or no methane (substantially no methane), for example, less than about 5 mol %, or less than about 2 mole %, or less than about 1 mol %, methane based on the moles of methane, carbon dioxide, carbon monoxide and hydrogen in the first gas stream (20).

Steam may be supplied to the syngas generator (100) and heat exchanger (170) by any of the steam boilers known to those skilled in the art. Such boilers can be powered, for example, through the use of any carbonaceous material such as powdered coal, biomass etc., and including but not limited to rejected carbonaceous materials from the feedstock preparation operations (e.g., fines, supra). Steam can also be supplied from an additional gasifier coupled to a combustion turbine where the exhaust from the reactor is thermally exchanged to a water source and produce steam.

Advantageously, steam is supplied as process team generated from other process operations through process heat capture (such as generated in a waste heat boiler, generally referred to as "process steam") and, in some embodiments, is solely supplied as process steam to the syngas generator (100), and solely used as the aqueous quench stream (25). For example, when carbonaceous materials are dried with a fluid bed slurry drier, as discussed below for the preparation of the carbonaceous feedstocks (12,32), the steam generated through vaporization can be fed to the syngas generator (100) and/or heat exchanger (170). Further, steam generated by a heat exchanger unit or waste heat boiler (such as, for example, 170 in FIG. 1, and 400, 401, 402 and/or 403 in FIG. 2) can be fed to the syngas generator (100) and/or heat exchanger (170).

In certain embodiments, the overall process described herein for the generation of the methane-enriched raw product stream (50) is steam neutral, such that steam demand (pressure and amount) can be satisfied via heat exchange with process heat at the different stages therein, or steam positive, such that excess steam is produced and can be used, for example, for power generation.

The reaction in the syngas generator (100) also results in an ash by-product (60), which may be periodically or continuously removed from the syngas generator (100). Typically, the ash by-product (60) will have a low residual carbon content such as, for example, about 5 wt % or less, or about 3 wt % or less, or about 2 wt % or less, or about 1 wt % or less (total weight). When the syngas generator (100) is operated under non-slagging conditions, the ash will typically be removed as a solid. When the syngas generator (100) is operated under slagging conditions, the ash will typically be removed as a liquid (molten ash), or a liquid/solid mixture.

Syngas generators potentially suitable for use in conjunction with the present invention are, in a general sense, known to those of ordinary skill in the relevant art and include, for example, those based on technologies available from Royal Dutch Shell plc, ConocoPhillips Company, Siemens AG, Lurgi AG (Sasol), General Electric Company and others. Other potentially suitable syngas generators are disclosed, for example, in US2009/0018222A1, US2007/0205092A1 and U.S. Pat. No. 6,863,878.

Hydromethanation—Hydromethanation Reactor (200)

Any of several types of gasification reactors can be utilized for the hydromethanation reactor (200). Suitable reactors include those having a reaction chamber which is a counter-current fixed bed, a co-current fixed bed, a fluidized bed, or an entrained flow or moving bed reaction chamber.

The hydromethanation reactor (200) is typically a fluidized-bed reactor. The hydromethanation reactor (200) can, for example, be a "flow down" countercurrent configuration, where the carbonaceous feedstock (32) is introduced at a higher point so that the particles flow down the fluidized bed to a char by-product collection zone, and the gases flow in an upward direction and are removed at a point above the fluidized bed. Alternatively, the hydromethanation reactor (200) can be a "flow up" co-current configuration, where the carbonaceous feedstock (32) is fed at a lower point so that the particles flow up the fluidized bed, along with the gases, to a char by-product collection zone. Typically, in a "flow up" configuration, there will also be a collection zone at the bottom of the reactor for larger particles (including char) which are not fluidized.

As indicated above, the second carbonaceous feedstock (32), carbon monoxide, hydrogen, superheated steam and oxygen are reacted in the hydromethanation reactor (200) in the presence of a hydromethanation catalyst (31), and under suitable pressure and temperature conditions, to form the methane-enriched raw product stream (50).

Steps (e) and (f) occur within the hydromethanation reactor (200). The hydromethanation and oxidation/combustion reactions may occur contemporaneously. Depending on the configuration of the hydromethanation reactor (200), the two steps may occur within the same area in the reactor, or may predominant in one zone. For example, when the oxygen-rich gas stream (22) is fed into an area of the hydromethanation reactor (200) where char by-product collects, such as below an active hydromethanation fluidized bed zone, the hydromethanation reaction will predominate in the hydromethanation fluidized bed zone, and a partial oxidation/combustion reaction will predominate in the char by-product collection area.

The hydromethanation reactor (200) is desirably operated at moderate temperatures (i.e., the third temperature) of at least about 700° F. (about 371° C.), or of at least about 800° F. (about 427° C.), or of at least about 900° F. (about 482° C.), to about 1500° F. (about 816° C.), or to about 1400° F. (about 760° C.), or to about 1300° F. (704° C.); and a pressure (i.e., the third pressure) of about 250 psig (about 1825 kPa, absolute), or about 400 psig (about 2860 kPa), or about 450 psig (about 3204 kPa), or about 500 psig (about 3549 kPa), to about 800 psig (about 5617 kPa), or to about 700 psig (about 4928 kPa), or to about 600 psig (about 4238 kPa).

Typical gas flow velocities in the hydromethanation reactor (200) are from about 0.5 ft/sec (about 0.15 m/sec), or from about 1 ft/sec (about 0.3 m/sec), to about 2.0 ft/sec (about 0.6 m/sec), or to about 1.5 ft/sec (about 0.45 m/sec).

The hydromethanation reaction also has a steam demand, a heat demand and a syngas demand. These conditions in combination are important factors in determining the operating conditions for the remainder of the process.

For example, the steam demand of the hydromethanation reaction requires a molar ratio of steam to carbon in the feedstock of at least about 1. Typically, however, the molar ratio is greater than about 1, or from about 1.5 (or greater), to about 6 (or less), or to about 5 (or less), or to about 4 (or less), or to about 3 (or less), or to about 2 (or less). The moisture content of the second carbonaceous feedstock (32) in combination with the steam content (if any) of the second oxygen-rich gas stream (22) will determine the amount of steam to be added as part of the hydromethanation feed stream (30). This amount, taken in consideration of the moisture content of the first carbonaceous feedstock (12), and any moisture that may be added through quenching or other internal processes, will determine the amount of aqueous stream (18) added to the syngas generator (100) and/or quench stream (25) used in heat exchanger (170).

As also indicated above, the hydromethanation reaction is essentially thermally balanced but, due to process heat losses and other energy requirements, some heat must be added to the hydromethanation reactor (200) to maintain the thermal balance. The addition of the first gas stream (20) (or quenched first gas stream (30)) at a temperature above the operating temperature of the hydromethanation reactor (200) can be one mechanism for supplying this extra heat. Another mechanism is heat energy generated by the partial combustion/oxidation of carbon (from the carbonaceous feedstock) in the presence of the second oxygen-rich gas introduced into the hydromethanation reactor (200).

A person of ordinary skill in the art can determine the amount of heat required to be added to the hydromethanation reactor (200) to substantially maintain thermal balance. When the in situ carbon combustion/oxidation is considered in conjunction with flow rate, composition, temperature and pressure of the first gas stream (20) (or quenched first gas stream (30)), along with other process factors recognizable to those of ordinary skill in the relevant art, this will in turn dictate the temperature and pressure of the first gas stream (20) (or quenched first gas steam (30)) as it enters the hydromethanation reactor (200) and, in turn, the operating temperature and pressure of the syngas generator (100) and any quenching of the first gas stream (20) that may be necessary.

The second oxygen-rich gas stream (22) can be fed into the hydromethanation reactor (200) by any suitable means such as direct injection of purified oxygen, oxygen-air mixtures, or oxygen-inert gas mixtures into the reactor bottom. Generally, the second oxygen-rich gas stream (22) can be introduced as an admixture with steam (such as in combination with first gas stream (20) or quenched first gas stream (30)), typically at a point below the fluidized bed zone, in order to assist in fluidization of the fluidized bed, to avoid formation of hot spots in the reactor, and to avoid combustion of the gaseous products. The second oxygen-rich gas stream (22) can also advantageously be introduced into an area of the hydromethanation reactor (200) where by-product char is collected, typically in the bottom of the reactor, so that carbon in the by-product char is consumed as opposed to carbon in a more active hydromethanation zone.

Typically, the oxygen-rich gas stream (16) will be provided as a mixture with a steam stream, and introduced at a temperature of from about 400° F. (about 204° C.), or from about 450° F. (about 232° C.), or from about 500° F. (about 260° C.), to about 750° F. (about 399° C.), or to about 700° F. (about 371° C.), or to about 650° F. (about 343° C.), and at a pressure at least slightly higher than present in the hydromethanation reactor (200).

The gas utilized in the hydromethanation reactor (200) for pressurization and reaction of the second carbonaceous feedstock (32) comprises the first gas stream (20) (or quenched first gas stream (30)) and, optionally, additional steam, nitrogen, air, or inert gases such as argon, which can be supplied to the hydromethanation reactor (200) according to methods known to those skilled in the art (such as discussed above for the second oxygen-rich gas stream (22)). As a consequence, the first gas stream (20) (or quenched first gas stream (30)) must be provided at a higher pressure which allows it to enter the hydromethanation reactor (200).

The amount of oxygen as well as the injection rates and pressures are controlled to allow for partial combustion of carbon in the second carbonaceous feedstock, partially consumed second carbonaceous feedstock and/or char residue. As mentioned above, the partial combustion of carbon from the second carbonaceous feedstock in the presence of the second oxygen-rich gas stream generates heat as well as carbon monoxide and hydrogen needed to assist in the maintenance of the thermal and syngas balance of the hydromethanation process, thus in conjunction with the first gas stream (20) (or quenched first gas stream (30)) advantageously eliminating the need for recycle carbon monoxide and hydrogen gas loops, and external superheaters, in the process.

In this context, the variation of the amount of oxygen supplied to hydromethanation reactor (200) provides an advantageous process control. Increasing the amount of oxygen will increase the combustion, and therefore increase in situ heat generation. Decreasing the amount of oxygen will conversely decrease the in situ heat generation.

Advantageously, steam for the hydromethanation reaction is process steam generated from other process operations through process heat capture (such as generated in a waste heat boiler) and, in some embodiments, is solely supplied as process-generated steam. For example, steam generated by a heat exchanger unit or waste heat boiler can be fed to the hydromethanation reactor (200) via heat exchanger (170) (as quench steam (25)) and/or syngas generator (100) (as aqueous steam (18)) and/or added directly to feed gas stream (20).

In certain embodiments, the overall process described herein for the generation of the methane-enriched raw product stream (50) is substantially steam neutral, such that steam demand (pressure and amount) for the hydromethanation reaction can be satisfied via heat exchange with process heat at the different stages therein, or steam positive, such that excess steam is produced and can be used, for example, for power generation. Desirably, process-generated steam accounts for greater than about 95 wt %, or greater than about 97 wt %, or greater than about 99 wt %, or about 100 wt % or greater, of the steam demand of the hydromethanation reaction.

The result of the hydromethanation reaction is a methane-enriched raw product stream (50) typically comprising $CH_4$, $CO_2$, $H_2$, CO, $H_2S$, unreacted steam, entrained fines and, optionally, other contaminants such as $NH_3$, COS, HCN and/or elemental mercury vapor, depending on the nature of the carbonaceous material utilized for hydromethanation.

The methane-enriched raw product stream (50), upon exiting the hydromethanation reactor (200), will typically comprise at least about 20 mol %, or at least about 25 mol %, or at least about 27 mol %, methane based on the moles of methane, carbon dioxide, carbon monoxide and hydrogen in the methane-enriched raw product stream (50). In addition, the methane-enriched raw product stream (50) will typically comprise at least about 50 mol % methane plus carbon dioxide, based on the moles of methane, carbon dioxide, carbon monoxide and hydrogen in the methane-enriched raw product stream (50).

Further Gas Processing
Fines Removal

The hot gas effluent leaving the reaction chamber of the hydromethanation reactor (200) can pass through a fines remover unit (not pictured), incorporated into and/or external of the hydromethanation reactor (200), which serves as a disengagement zone. Particles too heavy to be entrained by the gas leaving the hydromethanation reactor (200) (i.e., fines) are returned to the reaction chamber (e.g., fluidized bed).

Residual entrained fines may be substantially removed, when necessary, by any suitable device such as internal and/or external cyclone separators optionally followed by Venturi scrubbers. The recovered fines can be processed to recover alkali metal catalyst, or directly recycled back to feedstock preparation as described in previously incorporated US2009/0217589A1.

Removal of a "substantial portion" of fines means that an amount of fines is removed from the resulting gas stream such that downstream processing is not adversely affected; thus, at least a substantial portion of fines should be removed. Some minor level of ultrafine material may remain in the resulting gas stream to the extent that downstream processing is not significantly adversely affected. Typically, at least about 90 wt %, or at least about 95 wt %, or at least about 98 wt %, of the fines of a particle size greater than about 20 µm, or greater than about 10 µm, or greater than about 5 µm, are removed.

Heat Exchange (400)

Depending on the hydromethanation conditions, the methane-enriched raw product stream (50) can be generated having at a temperature ranging from about 800° F. (about 427° C.) to about 1500° F. (about 816° C.), and more typically from about 1100° F. (about 593° C.) to about 1400° F. (about 760° C.), a pressure of from about 50 psig (about 446 kPa) to about 800 psig (about 5617 kPa), more typically from about 400 psig (about 2860 kPa) to about 600 psig (about 4238 kPa), and a velocity of from about 0.5 ft/sec (about 0.15 m/sec) to about 2.0 ft/sec (about 0.61 m/sec), more typically from about 1.0 ft/sec (0.30 m/sec) to about 1.5 ft/sec (about 0.46 m/sec).

Figure 2:
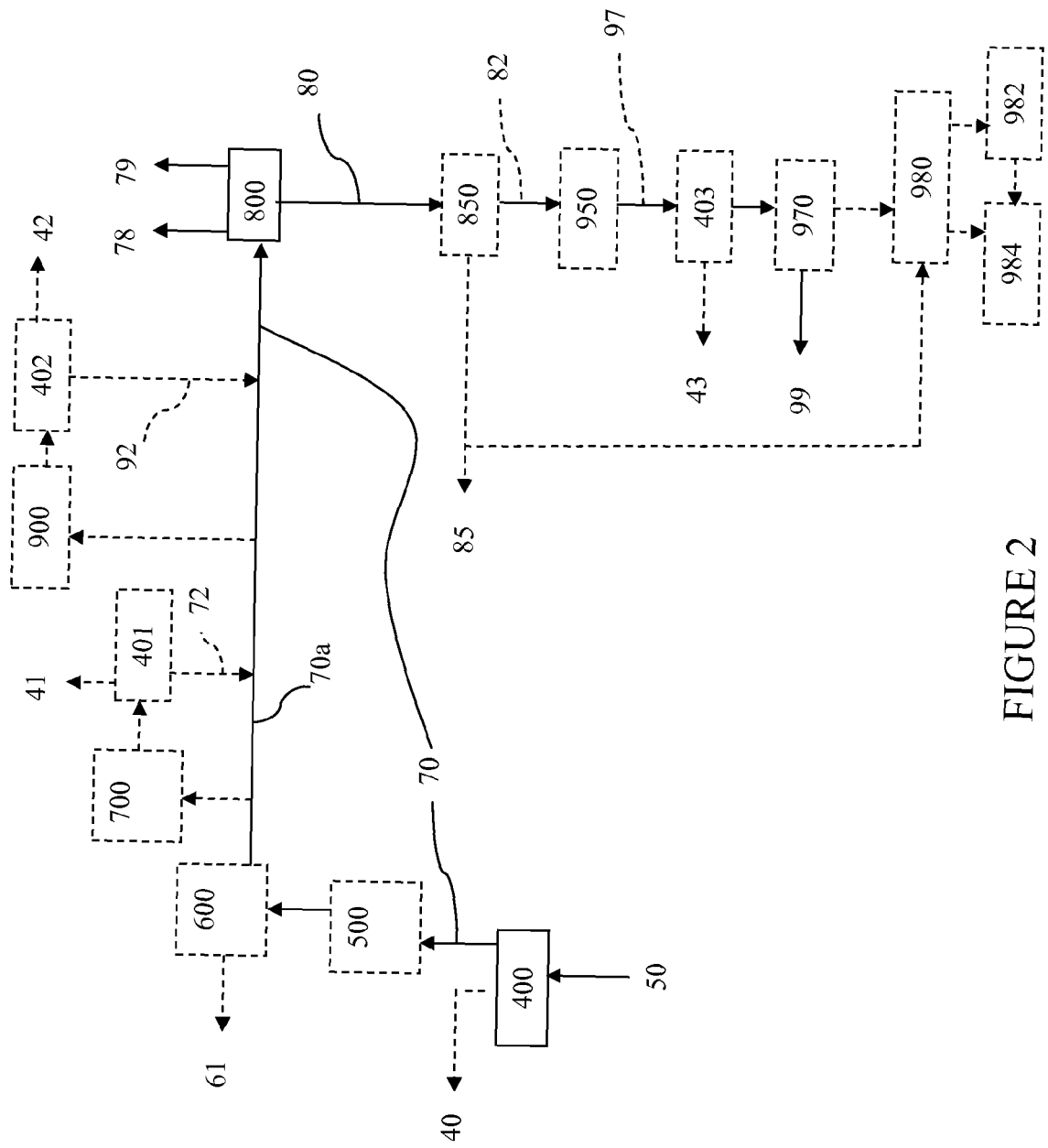
FIG. 2 is a diagram of a process for the further processing of a methane-enriched raw product stream to generate a methane product stream.

The methane-enriched raw product stream (50) can be, for example, provided to a heat recovery unit, e.g., heat exchanger (400) as shown in FIG. 2. The heat exchanger (400) removes at least a portion of the heat energy from the methane-enriched raw product stream (50) and reduces the temperature of the methane-enriched raw product stream (50)

to generate a cooled methane-enriched raw product stream (70) having a temperature less than the methane-enriched raw product stream (50). The heat energy recovered by heat exchanger (400) can be used to generate a second process steam stream (40) of which at least a portion of the second process steam stream (40) can, for example, be recycled to the syngas generator (100), used as the aqueous quench stream (25) or both.

The resulting cooled methane-enriched raw product stream (70) will typically exit the heat exchanger (400) at a temperature ranging from about 450° F. (about 232° C.) to about 1100° F. (about 593° C.), more typically from about 550° F. (about 288° C.) to about 950° F. (about 510° C.), a pressure of from about 50 psig (about 446 kPa) to about 800 psig (about 5617 kPa), more typically from about 400 psig (about 2860 kPa) to about 600 psig (about 4238 kPa), and a velocity of from about 0.5 ft/sec (about 0.15 m/sec) to about 2.0 ft/sec (about 0.61 m/sec), more typically from about 1.0 ft/sec (0.30 m/sec) to about 1.5 ft/sec (about 0.46 m/sec).

Gas Purification

Product purification may comprise, for example, optional trace contaminant removal (500), optional ammonia removal and recovery (600), and optional sour shift processes (700), followed by required acid gas removal (800). Methanation (900 and 950) can be performed before and/or after acid gas removal (800). The acid gas removal (800) may be performed on the cooled methane-enriched raw product stream (70) passed directly from heat exchanger (400), or on the cooled methane-enriched raw product stream (70) that has passed through either one or more of (i) one or more of the trace contaminants removal units (500); (ii) one or more ammonia recovery units (600); (iii) one or more sour shift units (700); and (iv) one or more sulfur-tolerant catalytic methanation units (900).

Trace Contaminant Removal (500)

As is familiar to those skilled in the art, the contamination levels of the gas stream, e.g., cooled methane-enriched raw product stream (70), will depend on the nature of the carbonaceous material used for preparing the carbonaceous feedstocks. For example, certain coals, such as Illinois #6, can have high sulfur contents, leading to higher COS contamination; and other coals, such as Powder River Basin coals, can contain significant levels of mercury which can be volatilized in the syngas generator and/or hydromethanation reactor.

COS can be removed from a gas stream, e.g. the cooled methane-enriched raw product stream (70), by COS hydrolysis (see, U.S. Pat. Nos. 3,966,875, 4,011,066, 4,100,256, 4,482,529 and 4,524,050), passing the gas stream through particulate limestone (see, U.S. Pat. No. 4,173,465), an acidic buffered $CuSO_4$ solution (see, U.S. Pat. No. 4,298,584), an alkanolamine absorbent such as methyldiethanolamine, triethanolamine, dipropanolamine or diisopropanolamine, containing tetramethylene sulfone (sulfolane, see, U.S. Pat. No. 3,989,811); or counter-current washing of the cooled second gas stream with refrigerated liquid $CO_2$ (see, U.S. Pat. Nos. 4,270,937 and 4,609,388).

HCN can be removed from a gas stream, e.g., the cooled methane-enriched raw product stream (70), by reaction with ammonium sulfide or polysulfide to generate $CO_2$, $H_2S$ and $NH_3$ (see, U.S. Pat. Nos. 4,497,784, 4,505,881 and 4,508,693), or a two stage wash with formaldehyde followed by ammonium or sodium polysulfide (see, U.S. Pat. No. 4,572,826), absorbed by water (see, U.S. Pat. No. 4,189,307), and/or decomposed by passing through alumina supported hydrolysis catalysts such as $MoO_3$, $TiO_2$ and/or $ZrO_2$ (see, U.S. Pat. Nos. 4,810,475, 5,660,807 and 5,968,465).

Elemental mercury can be removed from a gas stream, e.g., the cooled methane-enriched raw product stream (70), for example, by absorption by carbon activated with sulfuric acid (see, U.S. Pat. No. 3,876,393), absorption by carbon impregnated with sulfur (see, U.S. Pat. No. 4,491,609), absorption by a $H_2S$-containing amine solvent (see, U.S. Pat. No. 4,044,098), absorption by silver or gold impregnated zeolites (see, U.S. Pat. No. 4,892,567), oxidation to HgO with hydrogen peroxide and methanol (see, U.S. Pat. No. 5,670,122), oxidation with bromine or iodine containing compounds in the presence of $SO_2$ (see, U.S. Pat. No. 6,878,358), oxidation with a H, Cl and O-containing plasma (see, U.S. Pat. No. 6,969,494), and/or oxidation by a chlorine-containing oxidizing gas (e.g., ClO, see, U.S. Pat. No. 7,118,720).

When aqueous solutions are utilized for removal of any or all of COS, HCN and/or Hg, the waste water generated in the trace contaminants removal units can be directed to a waste water treatment unit (not depicted).

When present, a trace contaminant removal of a particular trace contaminant should remove at least a substantial portion (or substantially all) of that trace contaminant from the so-treated gas stream (e.g., cooled methane-enriched raw product stream (70)), typically to levels at or lower than the specification limits of the desired product stream. Typically, a trace contaminant removal should remove at least 90%, or at least 95%, or at least 98%, of COS, HCN and/or mercury from a cooled first gas stream.

Ammonia Removal and Recovery (600)

As is familiar to those skilled in the art, gasification of biomass, certain coals and/or utilizing air as an oxygen source for the catalytic gasifier can produce significant quantities of ammonia in the product stream. Optionally, a gas stream, e.g. the cooled methane-enriched raw product stream (70), can be scrubbed by water in one or more ammonia removal and recovery units (600) to remove and recover ammonia. The ammonia recovery treatment may be performed, for example, on the cooled methane-enriched raw product stream (70), directly from heat exchanger (170) or after treatment in one or both of (i) one or more of the trace contaminants removal units (500), and (ii) one or more sour shift units (700).

After scrubbing, the gas stream, e.g., the cooled methane-enriched raw product stream (70), will typically comprise at least $H_2S$, $CO_2$, CO, $H_2$ and $CH_4$. When the cooled methane-enriched raw product stream (70) has previously passed through a sour shift unit (700), then, after scrubbing, the gas stream will typically comprise at least $H_2S$, $CO_2$, $H_2$ and $CH_4$.

Ammonia can be recovered from the scrubber water according to methods known to those skilled in the art, can typically be recovered as an aqueous solution (61) (e.g., 20 wt %). The waste scrubber water can be forwarded to a waste water treatment unit (not depicted).

When present, an ammonia removal process should remove at least a substantial portion (and substantially all) of the ammonia from the scrubbed stream, e.g., the cooled methane-enriched raw product stream (70). "Substantial" removal in the context of ammonia removal means removal of a high enough percentage of the component such that a desired end product can be generated. Typically, an ammonia removal process will remove at least about 95%, or at least about 97%, of the ammonia content of a scrubbed first gas stream, based on the weight of ammonia in the stream prior to treatment.

Sour Shift (700)

A portion or all of the methane-enriched raw product stream (e.g., cooled methane-enriched raw product stream (70)) can be optionally supplied to a sour shift reactor (700) to undergo a sour shift reaction (also known as a water-gas shift reaction) in the presence of an aqueous medium (such as steam) to convert a portion of the CO to $CO_2$ and to increase the fraction of $H_2$ in order to produce a hydrogen-enriched raw product stream (72). In certain examples, the generation of increased hydrogen content can be utilized to form a hydrogen product gas which can be separated from methane as discussed below. In certain other examples, a sour shift process may be used to adjust the hydrogen:carbon monoxide ratio in a gas stream, e.g., the cooled methane-enriched raw product stream (70), for providing to a subsequent methanator, which is particularly useful when such molar ratio is less than about 3:1. The water-gas shift treatment may be performed on the cooled methane-enriched raw product stream (70) passed directly from the heat exchanger (400), or on the cooled methane-enriched raw product stream (70) that has passed through a trace contaminants removal unit (500) and/or an ammonia removal unit (600).

A sour shift process is described in detail, for example, in U.S. Pat. No. 7,074,373. The process involves adding water, or using water contained in the gas, and reacting the resulting water-gas mixture adiabatically over a steam reforming catalyst. Typical steam reforming catalysts include one or more Group VIII metals on a heat-resistant support.

Methods and reactors for performing the sour gas shift reaction on a CO-containing gas stream are well known to those of skill in the art. Suitable reaction conditions and suitable reactors can vary depending on the amount of CO that must be depleted from the gas stream. In some embodiments, the sour gas shift can be performed in a single stage within a temperature range from about 100° C., or from about 150° C., or from about 200° C., to about 250° C., or to about 300° C., or to about 350° C. In these embodiments, the shift reaction can be catalyzed by any suitable catalyst known to those of skill in the art. Such catalysts include, but are not limited to, $Fe_2O_3$-based catalysts, such as $Fe_2O_3$—$Cr_2O_3$ catalysts, and other transition metal-based and transition metal oxide-based catalysts. In other embodiments, the sour gas shift can be performed in multiple stages. In one particular embodiment, the sour gas shift is performed in two stages. This two-stage process uses a high-temperature sequence followed by a low-temperature sequence. The gas temperature for the high-temperature shift reaction ranges from about 350° C. to about 1050° C. Typical high-temperature catalysts include, but are not limited to, iron oxide optionally combined with lesser amounts of chromium oxide. The gas temperature for the low-temperature shift ranges from about 150° C. to about 300° C., or from about 200° C. to about 250° C. Low-temperature shift catalysts include, but are not limited to, copper oxides that may be supported on zinc oxide or alumina. Suitable methods for the sour shift process are described in previously incorporated U.S. patent application Ser. No. 12/415,050.

In some embodiments, it will be desirable to remove a substantial portion of the CO from the cooled methane-enriched raw product stream (70), and thus convert a substantial portion of the CO. "Substantial" conversion in this context means conversion of a high enough percentage of the component such that a desired end product can be generated. Typically, streams exiting the shift reactor, where a substantial portion of the CO has been converted, will have a carbon monoxide content of about 250 ppm or less CO, and more typically about 100 ppm or less CO.

In other embodiments, it will be desirable to convert only a portion of the CO so as to increase the fraction of $H_2$ for a subsequent methanation, e.g., a trim methanation, which will typically require an $H_2$/CO molar ratio of about 3 or greater, or greater than about 3, or about 3.2 or greater.

The sour shift reaction is exothermic, so it is often carried out with a heat exchanger and steam generators (401) to permit the efficient use of heat energy. Shift reactors employing these features are well known to those of skill in the art. An example of a suitable shift reactor is illustrated in previously incorporated U.S. Pat. No. 7,074,373, although other designs known to those of skill in the art are also effective.

Following the sour gas shift procedure, the cooled methane-enriched raw product stream (70) generally contains $CH_4$, $CO_2$, $H_2$, $H_2S$ and steam, and typically some CO as well (for downstream methanation).

The hydrogen-enriched raw product stream (72), if present, can be provided to a heat recovery unit, e.g., heat exchanger (401). While the heat exchanger (401) is depicted as a separate unit, it can exist as such and/or be integrated into the sour shift reactor (700), thus being capable of cooling the sour shift reactor (700) and removing at least a portion of the heat energy from the hydrogen-enriched raw product stream (72), if present, to reduce the temperature of the hydrogen-enriched raw product stream (72), if present, to generate a cooled hydrogen-enriched raw product stream. At least a portion of the recovered heat energy can be used to generate a recycle steam stream (41) from a water/steam source.

As the sour shifting step is optional, a gas bypass loop (70a) in communication with the first heat recovery unit (400) can be provided to allow some or all of the cooled methane-enriched raw product stream (70) exiting the first heat recovery unit (400) to bypass the sour shift reactor (700) and the second heat recovery unit (e.g., heat exchanger (401)) altogether and enter the acid gas removal unit (800).

Acid Gas Removal (800)

A subsequent acid gas removal unit (800) can be used to remove a substantial portion of $H_2S$ and a substantial portion of the $CO_2$ from the methane-enriched raw product stream, e.g., cooled methane-enriched raw product stream (70), and generate a sweetened gas stream (80).

Acid gas removal processes typically involve contacting a gas stream with a solvent such as monoethanolamine, diethanolamine, methyldiethanolamine, diisopropylamine, diglycolamine, a solution of sodium salts of amino acids, methanol, hot potassium carbonate or the like to generate $CO_2$ and/or $H_2S$ laden absorbers. One method can involve the use of Selexol® (UOP LLC, Des Plaines, Ill. USA) or Rectisol® (Lurgi AG, Frankfurt am Main, Germany) solvent having two trains; each train containing an $H_2S$ absorber and a $CO_2$ absorber.

One method for removing acid gases from a methane-enriched raw product stream (70) is described in previously incorporated US2009/0220406A1.

At least a substantial portion (e.g., substantially all) of the $CO_2$ and/or $H_{2S}$ (and other remaining trace contaminants) should be removed via the acid gas removal processes. "Substantial" removal in the context of acid gas removal means removal of a high enough percentage of the component such that a desired end product can be generated. The actual amounts of removal may thus vary from component to component. For "pipeline-quality natural gas", only trace amounts (at most) of $H_2S$ can be present, although higher amounts of $CO_2$ may be tolerable.

Typically, at least about 85%, or at least about 90%, or at least about 92%, of the $CO_2$, and at least about 95%, or at least about 98%, or at least about 99.5%, of the $H_2S$, should be removed from the cooled methane-enriched raw product stream (70).

Losses of desired product (methane) in the acid gas removal step should be minimized such that the sweetened gas stream (80) comprises at least a substantial portion (and substantially all) of the methane from the second gas stream (e.g., cooled methane-enriched raw product stream (70)). Typically, such losses should be about 2 mol % or less, or about 1.5 mol % or less, or about 1 mol % of less, of the methane from the cooled methane-enriched raw product stream (70).

The resulting sweetened gas stream (80) will generally comprise $CH_4$ and $H_2$, typically some CO (especially where downstream methanation is performed), and typically small amounts of $CO_2$ and $H_2O$.

Any recovered $H_2S$ (78) from the acid gas removal (and other processes such as sour water stripping) can be converted to elemental sulfur by any method known to those skilled in the art, including the Claus process. Sulfur can be recovered as a molten liquid.

Any recovered $CO_2$ (79) from the acid gas removal can be compressed for transport in $CO_2$ pipelines, industrial use, and/or sequestration for storage or other processes such as enhanced oil recovery.

Hydrogen Separation (850)

Hydrogen may be separated from the sweetened gas stream (80) according to methods known to those skilled in the art, such as cryogenic distillation and the use of molecular sieves or gas separation (e.g., ceramic) membranes. See, for example, previously incorporated US2009/0259080A1.

Such separation can provide a hydrogen-depleted sweetened gas stream (82) which may be further processed as described below. The recovered hydrogen (85) can be used as an energy source and/or as a reactant. For example, the hydrogen can be used as an energy source for hydrogen-based fuel cells, for power and/or steam generation (980, 982, 984), and/or for a subsequent hydromethanation process.

Methanation (900 and 950)

The gasification processes described herein can utilize at least one methanation step to generate methane from the carbon monoxide and hydrogen present in one or more of the cooled methane-enriched raw product stream (70) and/or sweetened gas stream (80).

The methanation reaction can be carried out in any suitable reactor, e.g., a single-stage methanation reactor, a series of single-stage methanation reactors or a multistage reactor. Methanator reactors include, without limitation, fixed bed, moving bed or fluidized bed reactors. See, for instance, U.S. Pat. No. 3,958,957, 4,252,771, 3,996,014 and 4,235,044. The catalyst used in the methanation, and methanation conditions, will depend on the temperature, pressure and composition of the incoming gas stream.

For example, in one embodiment of the invention, at least a portion of the carbon monoxide and at least a portion of the hydrogen present in the cooled methane-enriched raw product stream (70) is reacted in a first catalytic methanator (900) in the presence of a sulfur-tolerant methanation catalyst to produce a methane-enriched first gas stream (92), which can then be subjected to acid gas removal as described above. At this stage, the cooled methane-enriched raw product stream (70) typically contains significant quantities of hydrogen sulfide which can deactivate certain methanation catalysts as is familiar to those skilled in the art. Therefore, in such embodiments, the catalytic methanator (900) comprises a sulfur-tolerant methanation catalyst such as molybdenum and/or tungsten sulfides. Further examples of sulfur-tolerant methanation catalysts include, but are not limited to, catalysts disclosed in U.S. Pat. Nos. 4,243,554, 4,243,553, 4,006,177, 3,958,957, 3,928,000 and 2,490,488; Mills and Steffgen, in Catalyst Rev. 8, 159 (1973)); and Schultz et al, U.S. Bureau of Mines, Rep. Invest. No. 6974 (1967).

In one particular example, the sulfur-tolerant methanation catalyst is a portion of the char by-product (54) generated by the hydromethanation reactor (200) which can be periodically removed from the hydromethanation reactor (200) and transferred to the first catalytic methanator (900), as is described in previously incorporated WO2010/033846A2. Operating conditions for a methanator utilizing the char can be similar to those set forth in previously incorporated U.S. Pat. No. 3,958,957. When one or more methanation steps are included in an integrated gasification process that employs at least a portion of the char product as the sulfur-tolerant methanation catalyst, the methanation temperatures generally range from about 450° C., or from about 475° C., or from about 500° C., to about 650° C., or to about 625° C., or to about 600° C. and at a pressure from about 400 to about 750 psig.

In other embodiments of the invention, if the sweetened gas stream (80) comprises hydrogen and greater than above 100 ppm carbon monoxide, carbon monoxide and hydrogen present in the sweetened gas stream (80) can be reacted in a second catalytic methanator (950) in the presence of a methanation catalyst to produce a methane-enriched gas stream (97).

Typically, one or more methanations (950) subsequent to acid gas removal (800) will be utilized. In certain embodiments of the invention, methanation steps both before (900) and after (950) acid gas removal (800) are performed.

As the methanation reaction is exothermic, in various embodiments the methane-enriched gas streams (92) and (97) may be, for example, further provided to a heat recovery unit, e.g., heat exchangers (402) and (403). While the heat exchangers (402) and (403) are depicted as separate units, they can exist as such and/or be integrated into the methanators (900) and (950), thus being capable of cooling the methanator units and removing at least a portion of the heat energy from the methane-enriched gas streams to reduce the temperature of the methane-enriched gas streams. The recovered heat energy can be utilized to generate recycle steam streams (42) and (43) from a water and/or steam source.

Methane Separation (970)

In various embodiments, the sweetened gas stream (80), or the hydrogen-depleted gas stream (82), or the methane-enriched gas stream (97) is the methane product stream (99). In various other embodiments, these streams can be further purified (970) to generate the methane product stream (99).

The gas streams can be processed, when necessary, to separate and recover $CH_4$ by any suitable gas separation method known to those skilled in the art including, but not limited to, cryogenic distillation and the use of molecular sieves or gas separation (e.g., ceramic) membranes. For example, when a sour shift process is present, the second gas stream may contain methane and hydrogen which can be separated according to methods familiar to those skilled in the art, such as cryogenic distillation.

Gas purification methods include the generation of methane hydrate as disclosed in previously incorporated US2009/0260287A, US2009/0259080A1 and US2009/0246120A1.

Pipeline-Quality Natural Gas

The invention provides processes and systems that, in certain embodiments, are capable of generating "pipeline-quality natural gas" from the hydromethanation of carbonaceous materials. A "pipeline-quality natural gas" typically refers to a natural gas that is (1) within ±5% of the heating value of pure methane (whose heating value is 1010 btu/ft$^3$ under standard atmospheric conditions), (2) substantially free of water (typically a dew point of about −40° C. or less), and (3) substantially free of toxic or corrosive contaminants. In some embodiments of the invention, the methane product stream (99) described in the above processes satisfies such requirements.

Waste Water Treatment

Residual contaminants in waste water resulting from any one or more of the trace contaminant removal, sour shift, ammonia removal, acid gas removal and/or catalyst recovery processes can be removed in a waste water treatment unit to allow recycling of the recovered water within the plant and/or disposal of the water from the plant process according to any methods known to those skilled in the art. Depending on the feedstock and reaction conditions, such residual contaminants can comprise, for example, phenols, CO, $CO_2$, $H_2S$, COS, HCN, ammonia, and mercury. For example, $H_2S$ and HCN can be removed by acidification of the waste water to a pH of about 3, treating the acidic waste water with an inert gas in a stripping column, and increasing the pH to about 10 and treating the waste water a second time with an inert gas to remove ammonia (see U.S. Pat. No. 5,236,557). $H_2S$ can be removed by treating the waste water with an oxidant in the presence of residual coke particles to convert the $H_2S$ to insoluble sulfates which may be removed by flotation or filtration (see U.S. Pat. No. 4,478,425). Phenols can be removed by contacting the waste water with a carbonaceous char containing mono- and divalent basic inorganic compounds (e.g., the solid char product or the depleted char after catalyst recovery, supra) and adjusting the pH (see U.S. Pat. No. 4,113,615). Phenols can also be removed by extraction with an organic solvent followed by treatment of the waste water in a stripping column (see U.S. Pat. Nos. 3,972,693, 4,025,423 and 4,162,902).

Process Steam

A steam feed loop can be provided for feeding the various process steam streams (e.g., 28, 40, 41, 42 and 43) generated from heat energy recovery.

The process steam streams can be generated by contacting a water/steam source with the heat energy recovered from the various process operations using one or more heat recovery units, such as heat exchangers (170), (400), (401), (402) and (403). Also, for example, when slurried carbonaceous materials are dried with a fluid bed slurry drier, as discussed below for the preparation of the catalyzed second carbonaceous feedstock (31+32), the steam generated through vaporization can be used as process steam.

Any suitable heat recovery unit known in the art may be used. For example, a steam boiler or any other suitable steam generator (such as a shell/tube heat exchanger) that can utilize the recovered heat energy to generate steam can be used to supply steam to syngas generator (100) and/or for mixing with the first gas stream (20) or for otherwise providing to the hydromethanation process. The heat exchangers may also function as superheaters for steam streams so that heat recovery through one of more stages of the process can be used to superheat the steam to a desired temperature and pressure, thus eliminating the need for separate superheaters.

While any water source can be used to generate steam, the water commonly used in known boiler systems is purified and deionized (about 0.3-1.0 μS/cm) so that corrosive processes are slowed.

In the context of the present process, the hydromethanation reaction will have a steam demand (temperature, pressure and volume), and the amount of recycle steam and process heat recovery can be sufficient to provide at least about 85 wt %, or at least about 90 wt %, or at least about 94 wt %, or at least about 97 wt %, or at least about 98 wt %, or at least about 99 wt %, of this total steam demand. The remaining about 15 wt % or less, or about 10 wt % or less, or about 6 wt % or less, or about 3 wt % or less, or about 2 wt % or less, or about 1 wt % or less, can be supplied by an aqueous make-up stream, which can be fed into the system as (or as a part of) quench stream (25) and/or steam stream (18).

As described above, the aqueous make-up stream can comprise water and/or make-up steam. In embodiments of the invention in which the aqueous make-up stream comprises make-up steam, a suitable steam boiler or steam generator can be used to provide the steam. Any of the steam boilers known to those skilled in the art can supply steam for the catalytic gasifier (300). Such boilers can be powered, for example, through the use of any carbonaceous material such as powdered coal, biomass etc., and including but not limited to rejected carbonaceous materials from the feedstock preparation operations (e.g., fines, supra). Steam can also be supplied from an additional catalytic gasifier coupled to a combustion turbine where the exhaust from the reactor is thermally exchanged to a water source and produce steam. Alternatively, the steam may be generated for the catalytic gasifiers as described in previously incorporated US2009/0165376A1, US2009/0217584A1 and US2009/0217585A1.

In another embodiment, the process steam stream supplies substantially all of the total steam demand for the hydromethanation reaction, in which there is substantially no aqueous make-up stream or supplemental superheaters.

In another embodiment, an excess of process steam is generated. The excess steam can be used, for example, for power generation via a steam turbine, and/or drying the carbonaceous feedstock in a fluid bed drier to a desired reduced moisture content, as discussed below.

Power Generation

A portion of the methane product stream (99) or sweetened gas stream (80) can be utilized for combustion (980) and steam generation (982), as can a portion of the recovered hydrogen (85). Steam generated by a steam generator (982) may be utilized within the preceding processes or provided to one or more power generators (984), such as a combustion or steam turbine, to produce electricity which may be either utilized within the plant or can be sold onto the power grid.

Preparation of Carbonaceous Feedstocks

Carbonaceous Materials Processing (90)

Carbonaceous materials, such as biomass and non-biomass (supra), can be prepared via crushing and/or grinding, either separately or together, according to any methods known in the art, such as impact crushing and wet or dry grinding to yield one or more carbonaceous particulates. Depending on the method utilized for crushing and/or grinding of the carbonaceous material sources, the resulting carbonaceous particulates may be sized (i.e., separated according to size) to provide the first carbonaceous feedstock (12) for use in the syngas generator (100), and/or for use in catalyst loading processes (350) to form a catalyzed second carbonaceous feedstock (31+32) for the hydromethanation reactor (200).

Any method known to those skilled in the art can be used to size the particulates. For example, sizing can be performed by screening or passing the particulates through a screen or number of screens. Screening equipment can include grizzlies, bar screens, and wire mesh screens. Screens can be static or incorporate mechanisms to shake or vibrate the screen. Alternatively, classification can be used to separate the carbonaceous particulates. Classification equipment can include ore sorters, gas cyclones, hydrocyclones, rake classifiers, rotating trommels or fluidized classifiers. The carbonaceous materials can be also sized or classified prior to grinding and/or crushing.

The carbonaceous particulate can be supplied as a fine particulate having an average particle size of from about 25 microns, or from about 45 microns, up to about 2500 microns, or up to about 500 microns. One skilled in the art can readily determine the appropriate particle size for the carbonaceous particulates. For example, when a fluidized bed reactor is used, such carbonaceous particulates can have an average particle size which enables incipient fluidization of the carbonaceous materials at the gas velocity used in the fluidized bed reactor. The particle size profile may be different for the syngas generator (100) and the hydromethanation reactor (200).

Additionally, certain carbonaceous materials, for example, corn stover and switchgrass, and industrial wastes, such as saw dust, either may not be amenable to crushing or grinding operations, or may not be suitable for use as such, for example due to ultra fine particle sizes. Such materials may be formed into pellets or briquettes of a suitable size for crushing or for direct use in, for example, a fluidized bed reactor. Generally, pellets can be prepared by compaction of one or more carbonaceous material; see for example, previously incorporated US2009/0218424A1. In other examples, a biomass material and a coal can be formed into briquettes as described in U.S. Pat. Nos. 4,249,471, 4,152,119 and 4,225,457. Such pellets or briquettes can be used interchangeably with the preceding carbonaceous particulates in the following discussions.

Additional feedstock processing steps may be necessary depending on the qualities of carbonaceous material sources. Biomass may contain high moisture contents, such as green plants and grasses, and may require drying prior to crushing. Municipal wastes and sewages also may contain high moisture contents which may be reduced, for example, by use of a press or roll mill (e.g., U.S. Pat. No. 4,436,028). Likewise, non-biomass, such as high-moisture coal, can require drying prior to crushing. Some caking coals can require partial oxidation to simplify operation. Non-biomass feedstocks deficient in ion-exchange sites, such as anthracites or petroleum cokes, can be pre-treated to create additional ion-exchange sites to facilitate catalyst loading and/or association. Such pre-treatments can be accomplished by any method known to the art that creates ion-exchange capable sites and/or enhances the porosity of the feedstock (see, for example, previously incorporated U.S. Pat. No. 4,468,231 and GB1599932). Oxidative pre-treatment can be accomplished using any oxidant known to the art.

The ratio and types of the carbonaceous materials in the carbonaceous particulates can be selected based on technical considerations, processing economics, availability, and proximity of the non-biomass and biomass sources. The availability and proximity of the sources for the carbonaceous materials can affect the price of the feeds, and thus the overall production costs of the catalytic gasification process. For example, the biomass and the non-biomass materials can be blended in at about 5:95, about 10:90, about 15:85, about 20:80, about 25:75, about 30:70, about 35:65, about 40:60, about 45:55, about 50:50, about 55:45, about 60:40, about 65:35, about 70:20, about 75:25, about 80:20, about 85:15, about 90:10, or about 95:5 by weight on a wet or dry basis, depending on the processing conditions.

Significantly, the carbonaceous material sources, as well as the ratio of the individual components of the carbonaceous particulates, for example, a biomass particulate and a non-biomass particulate, can be used to control other material characteristics of the carbonaceous particulates. Non-biomass materials, such as coals, and certain biomass materials, such as rice hulls, typically include significant quantities of inorganic matter including calcium, alumina and silica which form inorganic oxides (i.e., ash) in the catalytic gasifier. At temperatures above about 500° C. to about 600° C., potassium and other alkali metals can react with the alumina and silica in ash to form insoluble alkali aluminosilicates. In this form, the alkali metal is substantially water-insoluble and inactive as a catalyst. To prevent buildup of the residue in the hydromethanation reactor (200), a solid purge of char (52) comprising ash, unreacted carbonaceous material, and various other compounds (such as alkali metal compounds, both water soluble and water insoluble) can be routinely withdrawn.

In preparing the carbonaceous particulates, particularly when considering the hydromethanation reaction, the ash content of the various carbonaceous materials can be selected to be, for example, about 20 wt % or less, or about 15 wt % or less, or about 10 wt % or less, or about 5 wt % or less, depending on, for example, the ratio of the various carbonaceous materials and/or the starting ash in the various carbonaceous materials. In other embodiments, the resulting the carbonaceous particulates can comprise an ash content ranging from about 5 wt %, or from about 10 wt %, to about 20 wt %, or to about 15 wt %, based on the weight of the carbonaceous particulate. In other embodiments, the ash content of the carbonaceous particulate can comprise less than about 20 wt %, or less than about 15 wt %, or less than about 10 wt %, or less than about 8 wt %, or less than about 6 wt % alumina, based on the weight of the ash. In certain embodiments, the carbonaceous particulates can comprise an ash content of less than about 20 wt %, based on the weight of processed feedstock where the ash content of the carbonaceous particulate comprises less than about 20 wt % alumina, or less than about 15 wt % alumina, based on the weight of the ash.

Such lower alumina values in the carbonaceous particulates allow for, ultimately, decreased losses of catalysts, and particularly alkali metal catalysts, in the hydromethanation portion of the process. As indicated above, alumina can react with alkali source to yield an insoluble char comprising, for example, an alkali aluminate or aluminosilicate. Such insoluble char can lead to decreased catalyst recovery (i.e., increased catalyst loss), and thus, require additional costs of make-up catalyst in the overall process.

Additionally, the resulting carbonaceous particulates can have a significantly higher % carbon, and thus btu/lb value and methane product per unit weight of the carbonaceous particulate. In certain embodiments, the resulting carbonaceous particulates can have a carbon content ranging from about 75 wt %, or from about 80 wt %, or from about 85 wt %, or from about 90 wt %, up to about 95 wt %, based on the combined weight of the non-biomass and biomass.

In one example, a non-biomass and/or biomass is wet ground and sized (e.g., to a particle size distribution of from about 25 to about 2500 μm) and then drained of its free water (i.e., dewatered) to a wet cake consistency. Examples of suitable methods for the wet grinding, sizing, and dewatering are known to those skilled in the art; for example, see previously incorporated US2009/0048476A1. The filter cakes of the non-biomass and/or biomass particulates formed by the wet grinding in accordance with one embodiment of the present disclosure can have a moisture content ranging from about 40% to about 60%, or from about 40% to about 55%, or below 50%. It will be appreciated by one of ordinary skill in the art that the moisture content of dewatered wet ground carbonaceous materials depends on the particular type of carbonaceous materials, the particle size distribution, and the particular dewatering equipment used. Such filter cakes can be thermally treated, as described herein, to produce one or more reduced moisture carbonaceous particulates.

Each of the one or more carbonaceous particulates can have a unique composition, as described above. For example, two carbonaceous particulates can be utilized, where a first carbonaceous particulate comprises one or more biomass materials and the second carbonaceous particulate comprises one or more non-biomass materials. Alternatively, a single carbonaceous particulate comprising one or more carbonaceous materials utilized.

When an aqueous slurry is utilized as the first carbonaceous feedstock (12) (such as, for example, disclosed in previously incorporated US2009/0165376A1), the slurry can contain a ratio of carbonaceous material to water, by weight, which ranges from about 5:95 to about 60:40; for example, the ratio can be about 5:95, or about 10:90, or about 15:85, or about 20:80, or about 25:75, or about 30:70, or about 35:65, or about 40:60, or about 50:50, or about 60:40, or any other value inbetween. Any of carbonaceous materials can be used alone or in combination and slurried with water (as necessary) to produce the aqueous slurry with a predetermined carbon and water content.

The aqueous medium for preparing the aqueous slurry can either be produced from a clean water feed (e.g., a municipal water supply) and/or recycle processes. For example, reclaimed water from a sour water stripping operation and/or catalytic feedstock drying operations can be directed for preparation of the aqueous slurry. In one embodiment, the water is not clean but instead contains organic matter, such as untreated wastewater from farming, coal mining, municipal waste treatment facilities or like sources. The organic matter in the wastewater becomes part of the carbonaceous material as indicated below.

Typically, the hydromethanation reactor (200) is more sensitive to feedstock preparation then the syngas generator (100). Desirable particle size ranges for the hydromethanation reactor (200) are in the Geldart A and Geldart B ranges (including overlap between the two), depending on fluidization conditions, typically with limited amounts of fine (below about 25 microns) and coarse (greater than about 250 microns) material. Desirably, the syngas generator (100) should be capable of processing those portions of the feedstock not utilized in the hydromethanation reactor (200).

Catalyst Loading for Hydromethanation (350)

The hydromethanation catalyst is potentially active for catalyzing at least reactions (I), (II) and (III) described above. Such catalysts are in a general sense well known to those of ordinary skill in the relevant art and may include, for example, alkali metals, alkaline earth metals and transition metals, and compounds and complexes thereof. Typically, the hydromethanation catalyst is an alkali metal, such as disclosed in many of the previously incorporated references.

For the hydromethanation reaction, the one or more carbonaceous particulates are typically further processed to associate at least one hydromethanation catalyst, typically comprising a source of at least one alkali metal, to generate a catalyzed second carbonaceous feedstock (31+32).

The second carbonaceous particulate (32) provided for catalyst loading can be either treated to form a catalyzed second carbonaceous feedstock (31+32) which is passed to the hydromethanation reactor (200), or split into one or more processing streams, where at least one of the processing streams is associated with a hydromethanation catalyst to form at least one catalyst-treated feedstock stream. The remaining processing streams can be, for example, treated to associate a second component therewith. Additionally, the catalyst-treated feedstock stream can be treated a second time to associate a second component therewith. The second component can be, for example, a second hydromethanation catalyst, a co-catalyst, or other additive.

In one example, the primary hydromethanation catalyst can be provided to the single carbonaceous particulate (e.g., a potassium and/or sodium source), followed by a separate treatment to provide one or more co-catalysts and additives (e.g., a calcium source) to the same single carbonaceous particulate to yield the catalyzed second carbonaceous feedstock (31+32). For example, see previously incorporated US2009/0217590A1 and US2009/0217586A1. The hydromethanation catalyst and second component can also be provided as a mixture in a single treatment to the single second carbonaceous particulate to yield the catalyzed second carbonaceous feedstock (31+32).

When one or more carbonaceous particulates are provided for catalyst loading, then at least one of the carbonaceous particulates is associated with a hydromethanation catalyst to form at least one catalyst-treated feedstock stream. Further, any of the carbonaceous particulates can be split into one or more processing streams as detailed above for association of a second or further component therewith. The resulting streams can be blended in any combination to provide the catalyzed second carbonaceous feedstock (31+32), provided at least one catalyst-treated feedstock stream is utilized to form the catalyzed feedstock stream.

In one embodiment, at least one carbonaceous particulate is associated with a hydromethanation catalyst and optionally, a second component. In another embodiment, each carbonaceous particulate is associated with a hydromethanation catalyst and optionally, a second component.

Any methods known to those skilled in the art can be used to associate one or more hydromethanation catalysts with any of the carbonaceous particulates and/or processing streams. Such methods include but are not limited to, admixing with a solid catalyst source and impregnating the catalyst onto the processed carbonaceous material. Several impregnation methods known to those skilled in the art can be employed to incorporate the hydromethanation catalysts. These methods include but are not limited to, incipient wetness impregnation, evaporative impregnation, vacuum impregnation, dip impregnation, ion exchanging, and combinations of these methods.

In one embodiment, an alkali metal hydromethanation catalyst can be impregnated into one or more of the carbonaceous particulates and/or processing streams by slurrying with a solution (e.g., aqueous) of the catalyst in a loading tank. When slurried with a solution of the catalyst and/or co-catalyst, the resulting slurry can be dewatered to provide a catalyst-treated feedstock stream, again typically, as a wet cake. The catalyst solution can be prepared from any catalyst source in the present processes, including fresh or make-up catalyst and recycled catalyst or catalyst solution. Methods for dewatering the slurry to provide a wet cake of the catalyst-treated feedstock stream include filtration (gravity or vacuum), centrifugation, and a fluid press.

In another embodiment, as disclosed in previously incorporated U.S. patent application Ser. No. 12/648,469, the carbonaceous particulates are combined with an aqueous catalyst solution to generate a substantially non-draining wet cake, then mixed under elevated temperature conditions and finally dried to an appropriate moisture level.

One particular method suitable for combining a coal particulate and/or a processing stream comprising coal with a hydromethanation catalyst to provide a catalyst-treated feedstock stream is via ion exchange as described in previously incorporated US2009/0048476A1 and U.S. patent application Ser. No. 12/648,471. Catalyst loading by ion exchange mechanism can be maximized based on adsorption isotherms specifically developed for the coal, as discussed in the incorporated reference. Such loading provides a catalyst-treated feedstock stream as a wet cake. Additional catalyst retained on the ion-exchanged particulate wet cake, including inside the pores, can be controlled so that the total catalyst target value can be obtained in a controlled manner. The total amount of catalyst loaded can be controlled by controlling the concentration of catalyst components in the solution, as well as the contact time, temperature and method, as disclosed in the aforementioned incorporated references, and as can otherwise be readily determined by those of ordinary skill in the relevant art based on the characteristics of the starting coal.

In another example, one of the carbonaceous particulates and/or processing streams can be treated with the hydromethanation catalyst and a second processing stream can be treated with a second component (see previously incorporated US2007/0000177A1).

The carbonaceous particulates, processing streams, and/or catalyst-treated feedstock streams resulting from the preceding can be blended in any combination to provide the catalyzed second carbonaceous feedstock, provided at least one catalyst-treated feedstock stream is utilized to form the catalyzed second carbonaceous feedstock (31+32). Ultimately, the catalyzed second carbonaceous feedstock (31+32) is passed onto the hydromethanation reactor(s) (200).

Generally, each catalyst loading unit comprises at least one loading tank to contact one or more of the carbonaceous particulates and/or processing streams with a solution comprising at least one hydromethanation catalyst, to form one or more catalyst-treated feedstock streams. Alternatively, the catalytic component may be blended as a solid particulate into one or more carbonaceous particulates and/or processing streams to form one or more catalyst-treated feedstock streams.

Typically, when the hydromethanation catalyst is an alkali metal, it is present in the catalyzed second carbonaceous feedstock in an amount sufficient to provide a ratio of alkali metal atoms to carbon atoms in the particulate composition ranging from about 0.01, or from about 0.02, or from about 0.03, or from about 0.04, to about 0.10, or to about 0.08, or to about 0.07, or to about 0.06.

With some feedstocks, the alkali metal component may also be provided within the catalyzed second carbonaceous feedstock to achieve an alkali metal content of from about 3 to about 10 times more than the combined ash content of the carbonaceous material in the catalyzed second carbonaceous feedstock, on a mass basis.

Suitable alkali metals are lithium, sodium, potassium, rubidium, cesium, and mixtures thereof. Particularly useful are potassium sources. Suitable alkali metal compounds include alkali metal carbonates, bicarbonates, formates, oxalates, amides, hydroxides, acetates, or similar compounds. For example, the catalyst can comprise one or more of sodium carbonate, potassium carbonate, rubidium carbonate, lithium carbonate, cesium carbonate, sodium hydroxide, potassium hydroxide, rubidium hydroxide or cesium hydroxide, and particularly, potassium carbonate and/or potassium hydroxide.

Optional co-catalysts or other catalyst additives may be utilized, such as those disclosed in the previously incorporated references.

The one or more catalyst-treated feedstock streams that are combined to form the catalyzed second carbonaceous feedstock typically comprise greater than about 50%, greater than about 70%, or greater than about 85%, or greater than about 90% of the total amount of the loaded catalyst associated with the catalyzed second carbonaceous feedstock (31+32). The percentage of total loaded catalyst that is associated with the various catalyst-treated feedstock streams can be determined according to methods known to those skilled in the art.

Separate carbonaceous particulates, catalyst-treated feedstock streams, and processing streams can be blended appropriately to control, for example, the total catalyst loading or other qualities of the catalyzed second carbonaceous feedstock (31+32), as discussed previously. The appropriate ratios of the various stream that are combined will depend on the qualities of the carbonaceous materials comprising each as well as the desired properties of the catalyzed second carbonaceous feedstock (31+32). For example, a biomass particulate stream and a catalyzed non-biomass particulate stream can be combined in such a ratio to yield a catalyzed second carbonaceous feedstock (31+32) having a predetermined ash content, as discussed previously.

Any of the preceding catalyst-treated feedstock streams, processing streams, and processed feedstock streams, as one or more dry particulates and/or one or more wet cakes, can be combined by any methods known to those skilled in the art including, but not limited to, kneading, and vertical or horizontal mixers, for example, single or twin screw, ribbon, or drum mixers. The resulting catalyzed second carbonaceous feedstock (31+32) can be stored for future use or transferred to one or more feed operations for introduction into the hydromethanation reactor(s). The catalyzed second carbonaceous feedstock can be conveyed to storage or feed operations according to any methods known to those skilled in the art, for example, a screw conveyer or pneumatic transport.

Further, excess moisture can be removed from the catalyzed second carbonaceous feedstock (31+32). For example, the catalyzed second carbonaceous feedstock (31+32) may be dried with a fluid bed slurry drier (i.e., treatment with superheated steam to vaporize the liquid), or the solution thermally evaporated or removed under a vacuum, or under a flow of an inert gas, to provide a catalyzed second carbonaceous feedstock having a residual moisture content, for example, of about 10 wt % or less, or of about 8 wt % or less, or about 6 wt % or less, or about 5 wt % or less, or about 4 wt % or less.

Catalyst Recovery (300)

Reaction of the catalyzed second carbonaceous feedstock (31+32) under the described conditions generally provides the methane-enriched raw product stream (50) and a solid char by-product (52) from the hydromethanation reactor (200). The solid char by-product (52) typically comprises quantities of unreacted carbonaceous material and entrained catalyst. The solid char by-product (52) can be removed from the hydromethanation reactor (200) for sampling, purging, and/or catalyst recovery via a char outlet.

The term "entrained catalyst" as used herein means chemical compounds comprising a the catalytically active portion of the hydromethanation catalyst, such as an alkali metal component. For example, "entrained catalyst" can include, but is not limited to, soluble alkali metal compounds (such as alkali carbonates, alkali hydroxides, and alkali oxides) and/or insoluble alkali compounds (such as alkali aluminosilicates). The nature of catalyst components associated with the char extracted from a catalytic gasifier and methods for their recovery are discussed in detail in previously incorporated US2007/0277437A1, US2009/0165383A1, US2009/0165382A1, US2009/0169449A1 and US2009/0169448A1.

The solid char by-product (52) can be periodically withdrawn from the hydromethanation reactor (200) through a char outlet which is a lock hopper system, although other methods are known to those skilled in the art. Methods for removing solid char product are well known to those skilled in the art. One such method taught by EP-A-0102828, for example, can be employed.

The char by-product (52) from the hydromethanation reactor (200) may be passed to a catalytic recovery unit (300), as described below. Such char by-product (52) may also be split into multiple streams, one of which may be passed to a catalyst recovery unit (300), and another stream (54) which may be used, for example, as a methanation catalyst (as described above) and not treated for catalyst recovery.

In certain embodiments, when the hydromethanation catalyst is an alkali metal, the alkali metal in the solid char by-product (52) can be recovered to produce a catalyst recycle stream (56), and any unrecovered catalyst can be compensated by a catalyst make-up stream (58). The more alumina and silica that is in the feedstock, the more costly it is to obtain a higher alkali metal recovery.

In one embodiment, the solid char by-product (52) from the hydromethanation reactor (200) can be quenched with a recycle gas and water to extract a portion of the entrained catalyst. The recovered catalyst (56) can be directed to the catalyst loading unit (350) for reuse of the alkali metal catalyst. The depleted char (59) can, for example, be directed to any one or more of the feedstock preparation operations (90) for reuse in preparation of the catalyzed feedstock, combusted to power one or more steam generators (such as disclosed in previously incorporated US2009/0165376A1 and US2009/0217585A1), or used as such in a variety of applications, for example, as an absorbent (such as disclosed in previously incorporated US2009/0217582A1).

Other particularly useful recovery and recycling processes are described in U.S. Pat. No. 4,459,138, as well as previously incorporated US2007/0277437A1, US2009/0165383A1, US2009/0165382A1, US2009/0169449A1 and US2009/0169448A1. Reference can be had to those documents for further process details.

The recycle of catalyst can be to one or a combination of catalyst loading processes. For example, all of the recycled catalyst can be supplied to one catalyst loading process, while another process utilizes only makeup catalyst. The levels of recycled versus makeup catalyst can also be controlled on an individual basis among catalyst loading processes.

Multi-Train Processes

In the processes of the invention, each process may be performed in one or more processing units. For example, one or more hydromethanation reactors may be supplied with the carbonaceous feedstock from one or more catalyst loading and/or feedstock preparation unit operations. Similarly, the methane-enriched raw product streams generated by one or more hydromethanation reactors may be processed or purified separately or via their combination at a heat exchanger, sulfur-tolerant catalytic methanator, acid gas removal unit, trim methanator, and/or methane removal unit depending on the particular system configuration, as discussed, for example, in previously incorporated US2009/0324458A1, US2009/0324459A1, US2009/0324460A1, US2009/0324461A1 and US2009/0324462A1.

In certain embodiments, the processes utilize two or more hydromethanation reactors (e.g., 2-4 hydromethanation reactors). In such embodiments, the processes may contain divergent processing units (i.e., less than the total number of hydromethanation reactors) prior to the hydromethanation reactors for ultimately providing the catalyzed second carbonaceous feedstock to the plurality of hydromethanation reactors, and/or convergent processing units (i.e., less than the total number of hydromethanation reactors) following the catalytic gasifiers for processing the plurality of methane-enriched raw product streams generated by the plurality of hydromethanation reactors.

For example, the processes may utilize (i) divergent catalyst loading units to provide the catalyzed second carbonaceous feedstock to the hydromethanation reactors; (ii) divergent carbonaceous materials processing units to provide a carbonaceous particulate to the catalyst loading units; (iii) convergent heat exchangers to accept a plurality of methane-enriched raw product streams from the hydromethanation reactors; (iv) convergent sulfur-tolerant methanators to accept a plurality of cooled methane-enriched raw product streams from the heat exchangers; (v) convergent acid gas removal units to accept a plurality of cooled methane-enriched raw product gas streams from the heat exchangers or methane-enriched gas streams from the sulfur-tolerant methanators, when present; or (vi) convergent catalytic methanators or trim methanators to accept a plurality of sweetened gas streams from acid gas removal units.

When the systems contain convergent processing units, each of the convergent processing units can be selected to have a capacity to accept greater than a 1/n portion of the total gas stream feeding the convergent processing units, where n is the number of convergent processing units. For example, in a process utilizing 4 hydromethanation reactors and 2 heat exchangers for accepting the 4 methane-enriched raw product streams from the hydromethanation reactors, the heat exchanges can be selected to have a capacity to accept greater than ½ of the total gas volume (e.g., ½ to ¾) of the 4 gas streams and be in communication with two or more of the hydromethanation reactors to allow for routine maintenance of the one or more of the heat exchangers without the need to shut down the entire processing system.

Similarly, when the systems contain divergent processing units, each of the divergent processing units can be selected to have a capacity to accept greater than a 1/m portion of the total feed stream supplying the convergent processing units, where m is the number of divergent processing units. For example, in a process utilizing 2 catalyst loading units and a single carbonaceous material processing unit for providing the carbonaceous particulate to the catalyst loading units, the catalyst loading units, each in communication with the carbonaceous material processing unit, can be selected to have a capacity to accept ½ to all of the total volume of carbonaceous particulate from the single carbonaceous material processing unit to allow for routine maintenance of one of the catalyst loading units without the need to shut down the entire processing system.

We claim:

1. A process for generating a plurality of gaseous products from a carbonaceous feedstock, and generating a methane product stream, the process comprising the steps of:

(a) supplying a first particulate carbonaceous feedstock, a first oxygen-rich gas stream and, optionally, an aqueous stream comprising one or both of water and steam, to a syngas generator;

(b) reacting the first particulate carbonaceous feedstock in the presence of oxygen and, optionally, the aqueous stream, in the syngas generator, at a first temperature and a first pressure, to produce a first gas stream comprising hydrogen, carbon monoxide and, optionally, steam;

(c) cooling the first gas stream, optionally with a quench stream comprising one or both of water and steam, to generate a cooled first gas stream comprising hydrogen, carbon monoxide and steam at a second temperature and a second pressure;

(d) introducing a second carbonaceous feedstock, a hydromethanation catalyst, a second oxygen-rich gas stream and the cooled first gas stream to a hydromethanation reactor, the second carbonaceous feedstock comprising a carbon content;

(e) reacting a portion of the carbon content from the second carbonaceous feedstock in the hydromethanation reactor in the presence of oxygen to produce carbon monoxide, hydrogen and heat energy;

(f) reacting the second carbonaceous feedstock in the hydromethanation reactor in the presence of carbon monoxide, hydrogen, steam and hydromethanation catalyst, at a third temperature and a third pressure, to produce a methane-enriched raw product stream comprising methane, carbon monoxide, hydrogen and carbon dioxide;

(g) withdrawing the methane-enriched product stream from the hydromethanation reactor; and (h) treating the methane-enriched product stream to generate the methane product stream.

2. The process of claim 1, wherein the amount of the second oxygen-rich stream introduced into the hydromethanation reactor is varied to assist control of the third temperature.

3. The process of claim 1, wherein the methane-enriched raw product stream comprises at least about 20 mol % methane (based on the moles of methane, carbon dioxide, carbon monoxide and hydrogen in the methane-enriched raw product stream).

4. The process of claim 1, wherein the methane-enriched raw product stream comprises at least 50 mol % methane plus carbon dioxide (based on the moles of methane, carbon dioxide, carbon monoxide and hydrogen in the methane-enriched raw product stream).

5. The process of claim 1, wherein steam is supplied to the syngas generator, and the first gas stream further comprises steam.

6. The process of claim 1, wherein the first particulate carbonaceous feedstock is an aqueous slurry, and the first gas stream further comprises steam.

7. The process of claim 1, wherein an ash by-product is generated in step (b), which is continuously or periodically withdrawn from the syngas generator.

8. The process of claim 1, wherein the second carbonaceous feedstock is loaded with hydromethanation catalyst prior to being supplied to the hydromethanation reactor.

9. The process of claim 1, wherein the hydromethanation catalyst comprises an alkali metal.

10. The process of claim 1, wherein a char by-product is generated in steps (e) and (f), which is continuously or periodically withdrawn from the hydromethanation reactor.

11. The process of claim 10, wherein the hydromethanation catalyst comprises an alkali metal, the char by-product comprises an alkali metal content from the hydromethanation catalyst, at least a portion of the char by-product is treated to recover at least a portion of the alkali metal content, and at least a portion of the recovered alkali metal content is recycled for use as hydromethanation catalyst.

12. The process of claim 11, wherein the second carbonaceous feedstock is impregnated with hydromethanation catalyst prior to being supplied to the hydromethanation reactor, and the hydromethanation catalyst used to impregnate the second carbonaceous feedstock comprises recycled hydromethanation catalyst and a make-up hydromethanation catalyst.

13. The process of claim 1, wherein a char by-product is generated in steps (e) and (f), the hydromethanation reactor comprises a collection zone where the char by-product collects, and the second oxygen-rich gas stream is introduced into this collection zone of the hydromethanation reactor.

14. The process of claim 1, wherein the first particulate and second carbonaceous feedstocks comprise different carbonaceous materials.

15. The process of claim 1, wherein the first particulate and second carbonaceous feedstocks derive from the same carbonaceous material.

16. The process of claim 1, further comprising the step of processing the methane product stream to generate a pipeline-quality natural gas product.

17. The process of claim 1, which is a continuous process in which steps (a), (b), (c), (d), (e), (f), (g) and (h) are performed in a continuous manner.

18. The process of claim 1, wherein a single syngas generator supplies the first gas stream to a plurality of hydromethanation reactors.

19. The process of claim 18, wherein steps (q) and (r) are present.

20. The process of claim 18, wherein step (k) is present.

21. The process of claim 1, which is a once-through process.

* * * * *